US012628036B2

(12) United States Patent
Peng

(10) Patent No.: US 12,628,036 B2
(45) Date of Patent: May 12, 2026

(54) DATA TRANSMISSION METHOD AND APPARATUS

(71) Applicant: HUAWEI TECHNOLOGIES CO., LTD., Guangdong (CN)

(72) Inventor: Wenjie Peng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 391 days.

(21) Appl. No.: 18/325,867

(22) Filed: May 30, 2023

(65) Prior Publication Data
US 2023/0308940 A1 Sep. 28, 2023

Related U.S. Application Data

(63) Continuation of application No. PCT/CN2020/132966, filed on Nov. 30, 2020.

(51) Int. Cl.
*H04W 28/02* (2009.01)
*H04W 28/08* (2023.01)
*H04W 72/1268* (2023.01)
*H04W 72/40* (2023.01)
*H04W 88/04* (2009.01)

(52) U.S. Cl.
CPC ....... *H04W 28/0278* (2013.01); *H04W 28/08* (2013.01); *H04W 72/1268* (2013.01); *H04W 72/40* (2023.01); *H04W 88/04* (2013.01)

(58) Field of Classification Search
CPC . H04W 28/0278; H04W 28/08; H04W 72/40; H04W 72/1268; H04W 88/04
See application file for complete search history.

(56) References Cited

U.S. PATENT DOCUMENTS

2015/0098322 A1* 4/2015 Chen ................. H04W 28/0864
                                                          370/230
2016/0286429 A1* 9/2016 Chen ................. H04W 28/0933
2016/0338132 A1* 11/2016 Uchino ................... H04L 5/001
(Continued)

FOREIGN PATENT DOCUMENTS

CN        104936228 A        9/2015
CN        105589506 A        5/2016
(Continued)

OTHER PUBLICATIONS

Nokia et al, "HARQ feedback for groupcast in the light of minimum required communication range", 3GPP TSG-RAN WG2 Meeting #106 R2-1906831, 2019-05-17, total 2 pages.
(Continued)

*Primary Examiner* — Kenny S Lin

(57) ABSTRACT

Methods and apparatus are provided for data transmission. A remote device determines a sidelink multicast identifier identifying multicast between the remote device and a plurality of relay devices and sends uplink data to the plurality of relay devices in a multicast manner based on the sidelink multicast identifier. The uplink data is data sent by the remote device to a radio access network device. The remote device determines the sidelink multicast identifier, and sends the sidelink multicast identifier to the relay device to transmit the uplink data to the radio access network device based on multicast communication to improve uplink data transmission efficiency.

16 Claims, 10 Drawing Sheets

(56)     References Cited

U.S. PATENT DOCUMENTS

| | | | | |
|---|---|---|---|---|
| 2018/0049208 | A1* | 2/2018 | Ozturk | H04L 43/0882 |
| 2018/0054755 | A1* | 2/2018 | Lee | H04W 72/21 |
| 2018/0324641 | A1* | 11/2018 | Tsai | H04W 28/065 |
| 2019/0021026 | A1 | 1/2019 | Iskander et al. | |
| 2019/0132897 | A1* | 5/2019 | Pradas | G06N 7/01 |
| 2019/0223040 | A1 | 7/2019 | Lee et al. | |
| 2020/0058409 | A1* | 2/2020 | Pradas | H04W 76/15 |
| 2021/0345454 | A1* | 11/2021 | Dhanapal | H04W 76/27 |

FOREIGN PATENT DOCUMENTS

| | | | | |
|---|---|---|---|---|
| CN | 110582067 | A | 12/2019 | |
| CN | 111436121 | A | 7/2020 | |
| WO | WO-2015167546 | A1 * | 11/2015 | H04W 76/15 |

OTHER PUBLICATIONS

Huawei et al, "Further views on Rel-17 work area on NR sidelink enhancements for V2X and other use cases", 3GPP TSG RAN Meeting #85 RP-191831, Sep. 20, 2019, total 12 pages.

* cited by examiner

Radio access
network device
110

Remote device
120

Relay device 130

Relay device 220

Radio access
network
device 210

Remote device 240

Relay device 230

| NAS | | | | | | NAS |
|---|---|---|---|---|---|---|
| RRC | | | | RRC | NGAP | NGAP |
| PDCP | | | | PDCP | SCTP | SCTP |
| | | Adap. | | Adap. | IP | IP |
| SL-RLC | SL-RLC | RLC | | RLC | | |
| SL-MAC | SL-MAC | MAC | | MAC | L1/L2 | L1/L2 |
| SL-PHY | SL-PHY | PHY | | PHY | | |

| Remote UE | Relay UE | | gNB | NGC |
|---|---|---|---|---|

DATA TRANSMISSION METHOD AND APPARATUS

CROSS-REFERENCE TO RELATED APPLICATIONS

This application is a continuation of International Application No. PCT/CN2020/132966 filed on Nov. 30, 2020, the disclosure of which is hereby incorporated by reference in its entirety.

TECHNICAL FIELD

This disclosure relates to the communication field, and more specifically, to a data transmission method and an apparatus.

BACKGROUND

A user equipment to network (U2N) relay technology is a technology that can improve cell coverage. A U2N relay system includes a radio access network device, a relay device, and a remote device. The radio access network device communicates with the relay device through a Uu interface, and the relay device communicates with the remote device through a PC5 interface. The relay device may help the remote device access the radio access network device to obtain a service. For example, in downlink, the relay device obtains data of the remote device from the radio access network device, and forwards the data of the remote device to the remote device. Uplink data transmission is also similar. To be specific, after obtaining data from the remote device, the relay device forwards the data to the radio access network device.

In addition to improving network coverage based on the U2N relay, to further improve downlink transmission efficiency of the remote device, it may be further considered that a plurality of links simultaneously serve the remote device. For example, the remote device establishes, to the radio access network device by using a plurality of relay devices, indirect links that include only sidelinks, or the remote device establishes a plurality of indirect links to the radio access network device by using a plurality of relay devices, and establishes a direct link to the radio access network device. However, when the remote device sends data to the radio access network device through at least two links, transmission efficiency is low.

SUMMARY

This disclosure provides a data transmission method and an apparatus to improve uplink data transmission efficiency.

According to a first aspect, a data transmission method is provided. The method includes: A remote device determines a sidelink multicast identifier, where the sidelink multicast identifier identifies multicast between the remote device and a plurality of relay devices; and the remote device sends uplink data to the plurality of relay devices in a multicast manner based on the sidelink multicast identifier, where uplink data is data sent by the remote device to a radio access network device.

In this embodiment, the remote device first determines the multicast identifier, and sends the uplink data to the radio access network in the multicast manner based on the multicast identifier by using the plurality of relay devices. Therefore, reliability of sending the uplink data by the remote device by using the plurality of relay devices is improved, and uplink data transmission efficiency is also improved.

With reference to the first aspect, in a first possible implementation of the first aspect, the method further includes: The remote device sends a first message to the plurality of relay devices, where the first message includes the sidelink multicast identifier.

With reference to the first possible implementation of the first aspect, in a second possible implementation of the first aspect, the first message further includes sidelink bearer indication information and a first Uu bearer identifier, the first Uu bearer identifier identifies a first data radio bearer DRB between the remote device and the radio access network device, the sidelink bearer indication information indicates a sidelink multicast bearer, and there is a correspondence between the sidelink multicast bearer and the first DRB.

In this embodiment, the remote device sends, to the relay device, the sidelink bearer indication information and the first Uu bearer identifier that has a correspondence with the sidelink bearer indication information, so that the relay device can learn of a specific sidelink multicast bearer from which the uplink data sent by the remote device is received, to improve uplink data transmission efficiency.

With reference to any one of the first aspect or the first and the second possible implementations of the first aspect, in a third possible implementation of the first aspect, the method further includes: The remote device receives a configuration message from the radio access network device, where the configuration message includes a sidelink bearer configuration, the sidelink bearer configuration is for configuring a sidelink multicast bearer between the remote device and the plurality of relay devices, and that the remote device determines the sidelink multicast identifier includes determining the sidelink multicast identifier based on the configuration message.

With reference to the third possible implementation of the first aspect, in a fourth possible implementation of the first aspect, the method further includes: The remote device sends a second message to the radio access network device, where the second message includes the sidelink multicast identifier.

With reference to any one of the first aspect or the first and the second possible implementations of the first aspect, in a fifth possible implementation of the first aspect, after the remote device determines the sidelink multicast identifier, the method further includes: The remote device sends a second message to the radio access network device, where the second message includes the sidelink multicast identifier; and the remote device receives a configuration message from the radio access network device, where the configuration message includes a sidelink bearer configuration, the sidelink bearer configuration is for configuring a sidelink multicast bearer between the remote device and the plurality of relay devices, and the sidelink multicast bearer is for transmitting the uplink data in the multicast corresponding to the sidelink multicast identifier.

With reference to the fifth possible implementation of the first aspect, in a sixth possible implementation of the first aspect, the method further includes: The remote device receives first indication information from the radio access network device, where the first indication information indicates the remote device to determine the sidelink multicast identifier.

With reference to any one of the fourth to the sixth possible implementations of the first aspect, in a seventh possible implementation of the first aspect, the second message further includes second indication information, and the second indication information indicates that the multicast corresponding to the sidelink multicast identifier is used by the remote device to transmit the uplink data.

With reference to any one of the third to the seventh possible implementations of the first aspect, in an eighth possible implementation of the first aspect, the sidelink bearer configuration includes the sidelink bearer indication information, the sidelink bearer indication information indicates the sidelink multicast bearer, the configuration message further includes the first Uu bearer identifier, the first Uu bearer identifier identifies the first DRB between the remote device and the radio access network device, the sidelink bearer indication information indicates the sidelink multicast bearer, and there is a correspondence between the sidelink multicast bearer and the first DRB.

With reference to any one of the second to the eighth possible implementations of the first aspect, in a ninth possible implementation of the first aspect, the method further includes: The first DRB has correspondences with the sidelink multicast bearer and a sidelink unicast bearer.

With reference to the ninth possible implementation of the first aspect, in a tenth possible implementation of the first aspect, the method further includes: The remote device receives third indication information from the radio access network device, where the third indication information indicates that a transmission manner between the remote device and the plurality of relay devices is switched from multicast communication to unicast communication or from unicast communication to multicast communication.

In this embodiment of this application, both unicast communication and multicast communication configurations may be reserved between the remote device and the plurality of relay devices, and switching from unicast communication to multicast communication or switching from multicast communication to unicast communication may be performed based on the third indication information, so that the transmission manner between the remote device and the plurality of relay devices can be flexibly adjusted, to improve efficiency of sending uplink data by the remote device to a wireless device.

According to a second aspect, a data transmission method is provided. The method includes: A relay device receives a first message, where the first message includes a sidelink multicast identifier, and the sidelink multicast identifier identifies multicast between a remote device and the relay device; and the relay device receives uplink data sent by the remote device in a multicast manner based on the sidelink multicast identifier, where the uplink data is data sent by the remote device to a radio access network device.

In this embodiment, the relay device receives the sidelink multicast identifier, receives, based on the multicast identifier, the uplink data sent by the remote device, and sends the uplink data to the radio access network device, to improve uplink data transmission efficiency.

With reference to the second aspect, in a first possible implementation of the second aspect, the first message further includes sidelink bearer indication information and a first Uu bearer identifier, the first Uu bearer identifier identifies a first data radio bearer DRB between the remote device and the radio access network device, the sidelink bearer indication information indicates a sidelink multicast bearer, and there is a correspondence between the sidelink multicast bearer and the first DRB.

With reference to the second aspect or the first possible implementation of the second aspect, in a second possible implementation of the second aspect, that the relay device receives the first message includes: The relay device receives the first message from the remote device; or the relay device receives the first message from the radio access network device.

With reference to the second possible implementation of the second aspect, in a third possible implementation of the second aspect, when the relay device receives the first message from the remote device, the method further includes: The relay device sends a third message to the radio access network device, where the third message includes the sidelink multicast identifier; and the relay device receives a configuration message from the radio access network device, where the configuration message includes a sidelink bearer configuration and a second Uu bearer identifier, the sidelink bearer configuration includes the sidelink bearer indication information, the sidelink bearer indication information indicates the sidelink multicast bearer, the second Uu bearer identifier identifies a second data radio bearer DRB between the relay device and the radio access network device, and there is a correspondence between the sidelink multicast bearer and the second DRB.

In this embodiment, the relay device sends, to the radio access network device, the third message that carries the sidelink multicast identifier, and receives the sidelink bearer indication information and the second Uu bearer identifier corresponding to the sidelink bearer indication information that are sent by the radio access network device, so that the relay device can learn of a specific DRB through which the uplink data on the sidelink multicast bearer is sent to the radio access network device, to improve uplink data transmission efficiency.

With reference to the third possible implementation of the second aspect, in the third possible implementation of the second aspect, the third message further includes second indication information, and the second indication information indicates that the multicast corresponding to the sidelink multicast identifier is used by the remote device to transmit the uplink data.

According to a third aspect, a data transmission method is provided. The method includes: A radio access network device sends a configuration message to a remote device, where the configuration message includes a sidelink bearer configuration, the sidelink bearer configuration is for configuring a sidelink multicast bearer between the remote device and a relay device, the sidelink multicast bearer is for transmitting uplink data in multicast corresponding to a sidelink multicast identifier, and the sidelink multicast identifier identifies the multicast between the remote device and the relay device; and the radio access network device receives a response message from the remote device.

This embodiment provides a data transmission method. The radio access network device sends the sidelink bearer configuration to the remote device, so that the remote device configures the sidelink multicast bearer between the remote device and the relay device, and the sidelink multicast bearer transmits the uplink data in the multicast corresponding to the sidelink multicast identifier, to improve uplink data transmission efficiency.

With reference to the third aspect, in a first possible implementation of the third aspect, the sidelink bearer configuration includes a sidelink bearer indication message, the sidelink bearer indication information indicates the sidelink multicast bearer, the configuration message further includes a first Uu bearer identifier, the first Uu bearer identifier identifies a first data radio bearer DRB between the remote device and the radio access network device, the bearer indication information indicates the sidelink multi-cast bearer, and there is a correspondence between the sidelink multicast bearer and the first DRB.

With reference to the third aspect or the first possible implementation of the third aspect, in a second possible implementation of the third aspect, after the radio access network device sends the configuration message to the remote device, the method further includes: The radio access network device receives a second message from the remote device, where the second message includes the sidelink multicast identifier.

With reference to the third aspect or the first possible implementation of the third aspect, in a third possible implementation of the third aspect, the method further includes: The radio access network device receives a second message from the remote device, where the second message includes the sidelink multicast identifier, and the radio access network device sends the configuration message to the remote device based on the second message.

With reference to the third possible implementation of the third aspect, in a fourth possible implementation of the third aspect, before the radio access network device receives the second message from the remote device, the method further includes: The radio access network device sends first indication information to the remote device, where the indication information indicates the remote device to determine the sidelink multicast identifier.

With reference to any one of the second to the fourth possible implementations of the third aspect, in a fifth possible implementation of the third aspect, the method further includes: The radio access network device sends a first message to the relay device, where the first message includes the sidelink multicast identifier.

With reference to the fifth possible implementation of the third aspect, in a sixth possible implementation of the third aspect, the first message further includes the sidelink bearer indication information and the first Uu bearer identifier, the first Uu bearer identifier identifies the first data radio bearer DRB between the remote device and the radio access network device, the bearer indication information indicates the sidelink multicast bearer, and there is a correspondence between the sidelink multicast bearer and the first DRB.

With reference to any one of the second to the sixth possible implementations of the third aspect, in a seventh possible implementation of the third aspect, the second message further includes second indication information, and the second indication information indicates that the multi-cast corresponding to the sidelink multicast identifier is used by the remote device to transmit the uplink data.

With reference to the third aspect or the first possible implementation of the third aspect, in an eighth possible implementation of the third aspect, the method further includes: The radio access network device receives a third message from the relay device, where the third message includes the sidelink multicast identifier; and the radio access network device sends the configuration message to the relay device, where the configuration message includes the sidelink bearer configuration and a second Uu bearer identifier, the sidelink bearer configuration includes the sidelink bearer indication information, the sidelink bearer indication information indicates the sidelink multicast bearer, the second Uu bearer identifier identifies a second data radio bearer DRB between the relay device and the radio access network device, and there is a correspondence between the sidelink multicast bearer and the second DRB.

With reference to the eighth possible implementation of the third aspect, in a ninth possible implementation of the third aspect, the third message further includes second indication information, and the indication information indicates that the multicast corresponding to the sidelink multicast identifier is used by the remote device to transmit the uplink data.

With reference to any one of the third aspect or the first to the ninth possible implementations of the third aspect, in a tenth possible implementation of the third aspect, the method further includes: The first DRB has correspondences with the sidelink multicast bearer and a sidelink unicast bearer.

With reference to the tenth possible implementation of the third aspect, in an eleventh possible implementation of the third aspect, the method further includes: The radio access network device sends third indication information to the remote device, where the third indication information indi-cates that a transmission manner between the remote device and the relay device is switched from multicast communi-cation to unicast communication or from unicast communi-cation to multicast communication.

According to a fourth aspect, a data transmission method is provided. The method includes: A remote device obtains first indication information, where the first indication infor-mation indicates a splitting proportion of a data volume of a packet data convergence protocol PDCP entity; and the remote device calculates a buffer status BS based on the splitting proportion indicated by the first indication infor-mation.

In this embodiment, the remote device determines, based on the first indication information, the splitting proportion of the data volume of the PDCP entity, and determines a calculation manner of the BS in a BSR. This avoids an over-scheduling problem caused by repeated BSR requests, and enables uplink transmission of the remote device to adapt to an uplink status between a relay device and a radio access network device, to improve uplink data transmission efficiency.

With reference to the fourth aspect, in a first possible implementation of the fourth aspect, the splitting proportion includes a data proportion of a data volume that is of the PDCP entity and that is allocated to a first link and/or a data proportion of a data volume that is of the PDCP entity and that is allocated to a second link, the first link is used by the remote device to transmit uplink data to a radio access network device, and the second link is used by the remote device to transmit the uplink data to the radio access network device by using a plurality of relay devices; that the remote device calculates the BS based on the splitting proportion includes calculating a BS in a first buffer status report BSR based on the splitting proportion and/or calculating a BS in a second BSR based on the splitting proportion, where the first BSR is for requesting to schedule a Uu uplink resource, and the second BSR is for requesting to schedule a sidelink resource; and the remote device sends the first BSR and/or the second BSR to the radio access network device.

With reference to the fourth aspect or the first possible implementation of the fourth aspect, in a second possible implementation of the fourth aspect, that the remote device obtains the first indication information includes: The remote device receives the first indication information from the radio access network device; or the remote device obtains the first indication information locally preconfigured by the remote device.

With reference to any one of the fourth aspect or the first and the second possible implementations of the fourth aspect, in a third possible implementation of the fourth aspect, that the remote device calculates the buffer status BS based on the splitting proportion indicated by the first indication information includes: All data volumes of the PDCP entity are allocated to the BS in the first BSR, where the remote device sends the first BSR to the radio access network device; all data volumes of the PDCP entity are allocated to the BS in the second BSR, where the remote device sends the second BSR to the radio access network device; or the data volumes of the PDCP entity are allocated to the BR in the first BSR and the BR in the second BSR in a proportion, where a range of the splitting proportion is greater than 0 and less than 1, and the remote device sends the first BSR and the second BSR to the radio access network device.

With reference to any one of the fourth aspect or the first to the third possible implementations of the fourth aspect, in a fourth possible implementation of the fourth aspect, the splitting proportion is applicable to all data radio bearers DRBs of the remote device, and the PDCP entity is a PDCP entity of the DRB of the remote device.

With reference to any one of the fourth aspect or the first to the fourth possible implementations of the fourth aspect, in a fifth possible implementation of the fourth aspect, the first indication information further includes a bearer identifier, and the bearer identifier corresponds to the splitting proportion.

With reference to any one of the fourth aspect or the first to the fifth possible implementations of the fourth aspect, in a sixth possible implementation of the fourth aspect, the method further includes: The remote device receives second indication information from the network device, where the second indication information indicates the remote device to schedule the Uu uplink resource and the sidelink resource.

In this embodiment, the remote device schedules both the Uu uplink resource and the sidelink resource based on the second indication information sent by the radio access network device, so that scheduling efficiency can be improved.

According to a fifth aspect, a data transmission method is provided. The method includes: A radio access network device sends a first indication message to a remote device, where the first indication message indicates a splitting proportion of a data volume of a packet data convergence protocol PDCP entity; and the radio access network device receives a first buffer status report BSR and/or a second BSR sent by the remote device, where the first BSR is for requesting to schedule a Uu uplink resource, and the second BSR is for requesting to schedule a sidelink resource.

In this embodiment, the radio access network device sends the first indication message to the remote device, to indicate the remote device to determine the splitting proportion of the data volume of the PDCP entity, so that the remote device determines a calculation manner of a BS in a BSR, to avoid an over-scheduling problem caused by repeated BSR requests.

With reference to the fifth aspect, in a first possible implementation of the fifth aspect, the splitting proportion includes a data proportion of a data volume that is of the PDCP entity and that is allocated to a first link and/or a data proportion of a data volume that is of the PDCP entity and that is allocated to a second link, the first link is used by the radio access network device to receive uplink data transmitted by the remote device, and the second link is used by the radio access network device to receive, by using a plurality of relay devices, the uplink data transmitted by the remote device.

With reference to the fifth aspect or the first possible implementation of the fifth aspect, in a second possible implementation of the fifth aspect, the splitting proportion is applicable to all data radio bearers DRBs of the remote device, and the PDCP entity is a PDCP entity of the DRB of the remote device.

With reference to any one of the fifth aspect or the first and the second possible implementations of the fifth aspect, in a third possible implementation of the fifth aspect, the first indication information further includes a bearer identifier, and the bearer identifier corresponds to the splitting proportion.

With reference to any one of the fifth aspect or the first to the third possible implementations of the fifth aspect, in a fourth possible implementation of the fifth aspect, the method further includes: The radio access network device sends second indication information to the remote device, where the second indication information indicates the remote device to schedule the Uu uplink resource and the sidelink resource.

According to a sixth aspect, a data transmission method is provided. The method includes: A remote device receives a configuration message from a radio access network device, where the configuration message is for configuring a splitting proportion of data that is in a packet data convergence protocol PDCP entity and that is sent by the remote device to a plurality of relay devices; and the remote device sends the data in the PDCP entity to the plurality of relay devices based on the splitting proportion, where the data is uplink data sent by the remote device to a radio access network device.

In this embodiment, the remote device sends the uplink data to the plurality of relay devices based on the splitting proportion that is of the data volume of the PDCP entity and that is configured based on the configuration information, so that uplink transmission of the remote device adapts to an uplink status between the relay device and the radio access network device, and uplink data transmission efficiency is improved.

With reference to the sixth aspect, in a first possible implementation of the sixth aspect, the configuration message further includes first indication information, the first indication information indicates at least two sidelinks between the remote device and the plurality of relay devices, and the configuration message is for configuring a splitting proportion of data that is in the PDCP entity and that is sent by the remote device to each of the at least two sidelinks.

With reference to the sixth aspect, in a second possible implementation of the sixth aspect, the configuration message further includes second indication information, the second indication information indicates that one of the plurality of relay devices is a primary device, a remaining device in the plurality of relay devices is a secondary device, and the configuration message is for configuring a splitting proportion of data that is in the PDCP entity and that is separately sent by the remote device to the primary device and the secondary device.

With reference to any one of the sixth aspect or the first and the second possible implementations of the sixth aspect, in a third possible implementation of the sixth aspect, the splitting proportion is applicable to all data radio bearers DRBs of the remote device, and the PDCP entity is a PDCP entity of the DRB of the remote device.

According to a seventh aspect, a data transmission method is provided. The method includes: A radio access network device sends a configuration message to a remote device, where the configuration message is for configuring a splitting proportion of data that is in a packet data convergence protocol PDCP entity and that is sent by the remote device to a plurality of relay devices; and the radio access network device receives uplink data transmitted by the plurality of relay devices, where the uplink data is data sent by the remote device to the radio access network device.

In this embodiment, the radio access network device sends the configuration message of the splitting proportion of the data volume of the PDCP entity to the remote device, to enable the remote device to transmit the uplink data to the plurality of relay devices based on the splitting proportion, so that uplink transmission of the remote device adapts to an uplink status between the relay device and the radio access network device, and uplink data transmission efficiency is improved.

With reference to the seventh aspect, in a first possible implementation of the seventh aspect, the configuration message further includes first indication information, the first indication information indicates at least two sidelinks between the remote device and the plurality of relay devices, and the configuration message is for configuring a splitting proportion of data that is in the PDCP entity and that is sent by the remote device to each of the at least two sidelinks.

With reference to the seventh aspect, in a second possible implementation of the seventh aspect, the configuration message further includes second indication information, the second indication information indicates that one of the plurality of relay devices is a primary device, a remaining device in the plurality of relay devices is a secondary device, and the configuration message is for configuring a splitting proportion of data that is in the PDCP entity and that is separately sent by the remote device to the primary device and the secondary device.

With reference to any one of the seventh aspect or the first and the second possible implementations of the seventh aspect, in a third possible implementation of the seventh aspect, the splitting proportion is applicable to all data radio bearers DRBs of the remote device, and the PDCP entity is a PDCP entity of the DRB of the remote device.

According to an eighth aspect, a data transmission apparatus is provided. The apparatus has a function of implementing the method provided in any one of the first aspect or the possible implementations of the first aspect. The function may be implemented by hardware, or may be implemented by hardware executing corresponding software. The hardware or the software includes one or more units corresponding to the function.

According to a ninth aspect, a data transmission apparatus is provided. The apparatus has a function of implementing the method provided in any one of the second aspect or the possible implementations of the second aspect. The function may be implemented by hardware, or may be implemented by hardware executing corresponding software. The hardware or the software includes one or more units corresponding to the function.

According to a tenth aspect, a data transmission apparatus is provided. The apparatus has a function of implementing the method provided in any one of the third aspect or the possible implementations of the third aspect. The function may be implemented by hardware, or may be implemented by hardware executing corresponding software. The hardware or the software includes one or more units corresponding to the function.

According to an eleventh aspect, a data transmission apparatus is provided. The apparatus has a function of implementing the method provided in any one of the fourth aspect or the possible implementations of the fourth aspect. The function may be implemented by hardware, or may be implemented by hardware executing corresponding software. The hardware or the software includes one or more units corresponding to the function.

According to a twelfth aspect, a data transmission apparatus is provided. The apparatus has a function of implementing the method provided in any one of the fifth aspect or the possible implementations of the fifth aspect. The function may be implemented by hardware, or may be implemented by hardware executing corresponding software. The hardware or the software includes one or more units corresponding to the function.

According to a thirteenth aspect, a data transmission apparatus is provided. The apparatus has a function of implementing the method provided in any one of the sixth aspect or the possible implementations of the sixth aspect. The function may be implemented by hardware, or may be implemented by hardware executing corresponding software. The hardware or the software includes one or more units corresponding to the function.

According to a fourteenth aspect, a data transmission apparatus is provided. The apparatus has a function of implementing the method provided in any one of the seventh aspect or the possible implementations of the seventh aspect. The function may be implemented by hardware, or may be implemented by hardware executing corresponding software. The hardware or the software includes one or more units corresponding to the function.

According to a fifteenth aspect, a communication apparatus is provided. The apparatus includes a processor, configured to execute a computer program stored in a memory, to enable the communication apparatus to perform the communication method in any one of the first to the tenth possible implementations of the first aspect, the communication method in any one of the first to the third possible implementations of the second aspect, the communication method in any one of the first to the eleventh possible implementations of the third aspect, the communication method in any one of the first to the sixth possible implementations of the fourth aspect, the communication method in any one of the first to the fourth possible implementations of the fifth aspect, the communication method in any one of the first to the third possible implementations of the sixth aspect, or the communication method in any one of the first to the third possible implementations of the seventh aspect.

According to a sixteenth aspect, a computer-readable storage medium is provided. The computer-readable storage medium stores a computer program. When the computer program is run on a computer, the computer is enabled to perform the communication method in any one of the first to the tenth possible implementations of the first aspect, the communication method in any one of the first to the third possible implementations of the second aspect, the communication method in any one of the first to the eleventh possible implementations of the third aspect, the communication method in any one of the first to the sixth possible implementations of the fourth aspect, the communication method in any one of the first to the fourth possible implementations of the fifth aspect, the communication method in any one of the first to the third possible implementations of the sixth aspect, or the communication method in any one of the first to the third possible implementations of the seventh aspect.

According to a seventeenth aspect, a chip system is provided. The chip system includes a processor, configured to invoke a computer program from a memory and run the computer program, so that a communication device in which the chip system is installed performs the communication method in any one of the first to the tenth possible implementations of the first aspect, the communication method in any one of the first to the third possible implementations of the second aspect, the communication method in any one of the first to the eleventh possible implementations of the third aspect, the communication method in any one of the first to the sixth possible implementations of the fourth aspect, the communication method in any one of the first to the fourth possible implementations of the fifth aspect, the communication method in any one of the first to the third possible implementations of the sixth aspect, or the communication method in any one of the first to the third possible implementations of the seventh aspect.

According to an eighteenth aspect, a communication system is provided. The communication system includes the communication apparatus according to the eighth aspect, the communication apparatus according to the ninth aspect, and the communication apparatus according to the tenth aspect, or the communication apparatus according to the eleventh aspect and the apparatus according to the twelfth aspect, or the apparatus according to the thirteenth aspect and the apparatus according to the fourteenth aspect.

DESCRIPTION OF EMBODIMENTS

The following describes technical solutions of this disclosure with reference to accompanying drawings.

For example, to facilitate understanding of embodiments of this disclosure, the following describes concepts in the form of illustrative embodiments.

1. Buffer status report (BSR): If there is to-be-transmitted data in a buffer of a remote device, the remote device needs to first report a BSR to a radio access network device, and notify the radio access network device of a size of the to-be-transmitted data in the current buffer of the remote device by using the BSR. After receiving the BSR reported by the remote device, the radio access network device determines, based on the BSR, the size of the to-be-transmitted data of the remote device, allocates a corresponding uplink resource to the remote device, and indicates the remote device to transmit the data to a peer end on the allocated uplink resource.

2. Sidelink (SL): A link between user equipment (UE) and a UE is referred to as a sidelink. A typical application scenario of sidelink communication is an internet of vehicles. In the internet of vehicles, each vehicle may be considered as one UE, and data may be directly transmitted between UEs through the sidelink without passing through a radio access network device. In this way, a communication delay can be effectively reduced. Broadcast, unicast, and multi cast are supported on the sidelink.

3. Broadcast: Broadcast communication is similar to that a radio access network device broadcasts a system message. In other words, a UE sends data of a broadcast service without encryption, and another UE within a valid receiving range can receive the data of the broadcast service provided that the UE is interested in the broadcast service.

4. Unicast: Unicast communication is similar to data communication performed after a radio resource control (RRC) connection is established between a UE and a radio access network device, and a unicast connection needs to be first established between two UEs. After the unicast connection is established, the two UEs may perform data communication based on a negotiated identifier, where data may or may not be encrypted. Compared with broadcast communication, the unicast communication can be performed only between two UEs between which a unicast connection has been established.

5. Multicast: Multicast communication is communication between all UEs in one communication group, and any UE in the group can receive and send data of a multicast service.

Figure 1:
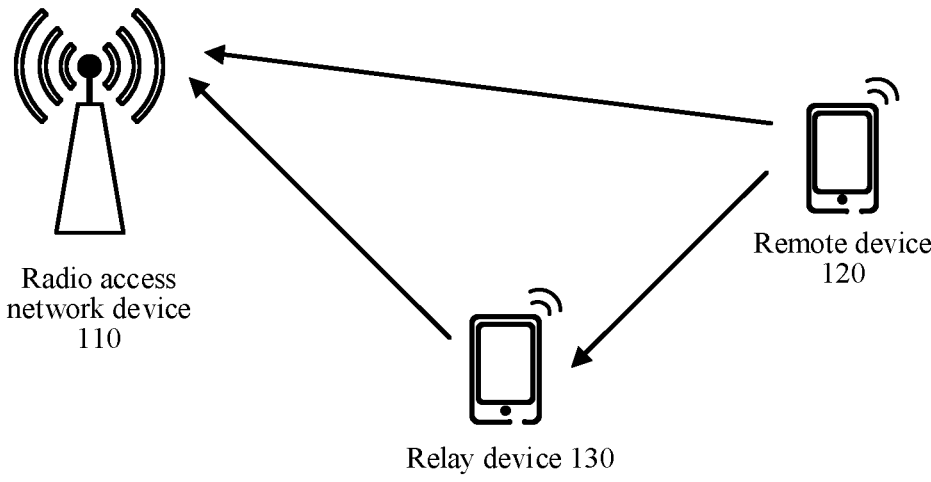
FIG. 1 is a schematic diagram of a scenario according to an embodiment.

FIG. 1 is a diagram of an architecture of a communication system according to an embodiment. As shown in FIG. 1, the communication system includes at least one radio access network device 110 (where FIG. 1 shows only one radio access network device), at least one relay device (where FIG. 1 shows only one relay device), and a remote device 120. For example, the remote device 120 and the relay device 130 may separately perform Uu link communication with the radio access network device 110 through a Uu interface. The remote device 220 and the relay device 230 may perform sidelink (SL) communication through a PC5 interface.

Usually, when sending data to the radio access network device 110, the remote device 120 may send a first buffer status report (BSR) to the radio access network device 110 to request uplink resource scheduling to obtain a Uu uplink resource, or may send a second BSR to the radio access network device 110 to request uplink resource scheduling to obtain a sidelink resource. The first BSR and the second BSR are in different media access control (MAC) control elements (CEs), but a Uu packet data convergence protocol (PDCP) is common. The radio access network device 110 may know how much data is on the bearer provided that the first BSR or the second BSR is received. Consequently, sending the first BSR and the second BSR causes resource over-scheduling.

Figure 2:
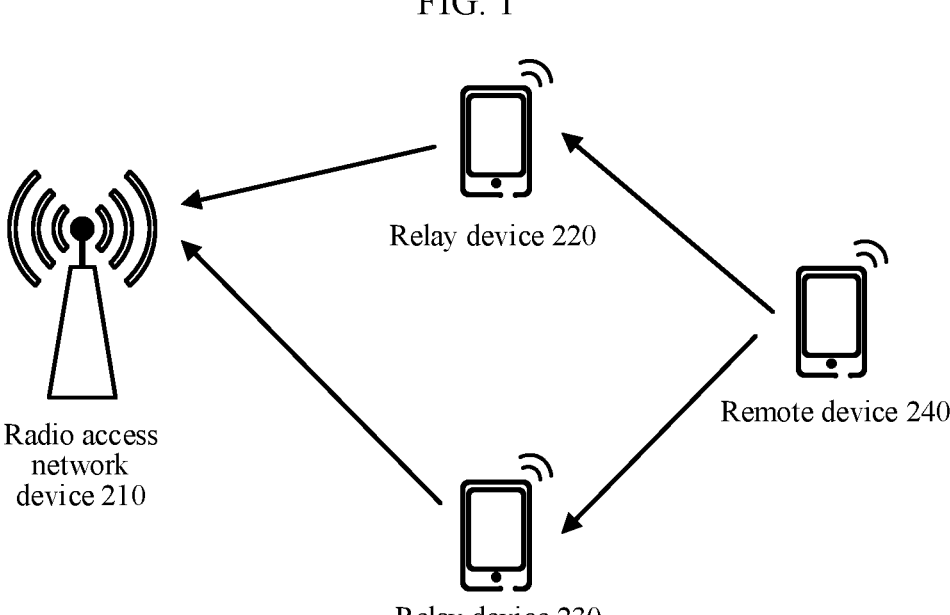
FIG. 2 is a schematic diagram of another scenario according to an embodiment.

FIG. 2 is a diagram of an architecture of another communication system according to an embodiment of this application. As shown in FIG. 2, the system includes at least one radio access network device 210 (where FIG. 2 shows only one radio access network device), a plurality of relay devices (where FIG. 2 shows only a relay device 220 and a relay device 230), and a remote device 240. For example, the remote device 240 and the relay device 220 perform sidelink communication through a PC5 interface, or the remote device 240 and the relay device 230 perform sidelink communication through a PC5 interface. The relay device 220 and the radio access network device 210 perform communication through a Uu interface. Similarly, the relay device 230 and the radio access network device 210 also perform communication through a Uu interface.

Usually, there may be two cases when the remote device 240 sends data to the radio access network device 210. In one case, the remote device 240 may obtain a sidelink resource in an autonomous resource selection mode (which may be referred to as a mode 2). The mode 2 is that the remote device 240 listens to usage of the sidelink resource, and when determining that the sidelink resource is available, the remote device 240 may directly occupy the sidelink resource to send data. In the mode 2, the radio access network device 210 does not need to perform resource scheduling. However, in this case, decision of the remote device 240 may not match a status of a transmission link between the radio access network device 210 and the relay device 220 or the relay device 230. For example, the remote device 240 determines to transmit more data to the relay device 220. However, a link between the relay device 230 and the radio access network device 210 can carry more data than a link between the relay device 220 and the radio access network device 210. Consequently, this transmission method may cause deterioration of uplink transmission performance.

In another case, a PDCP layer in the remote device may perform a duplication (duplication) operation to obtain two same PDCP packet data units (PDUs), and the remote device 240 may respectively send the two same PDCP PDUs to the relay device 220 and the relay device 230 through two unicast connections. However, in this case, the remote device sends same uplink data through two unicast connections, and occupies two resources. This results in low transmission efficiency.

Figures 3, 4:
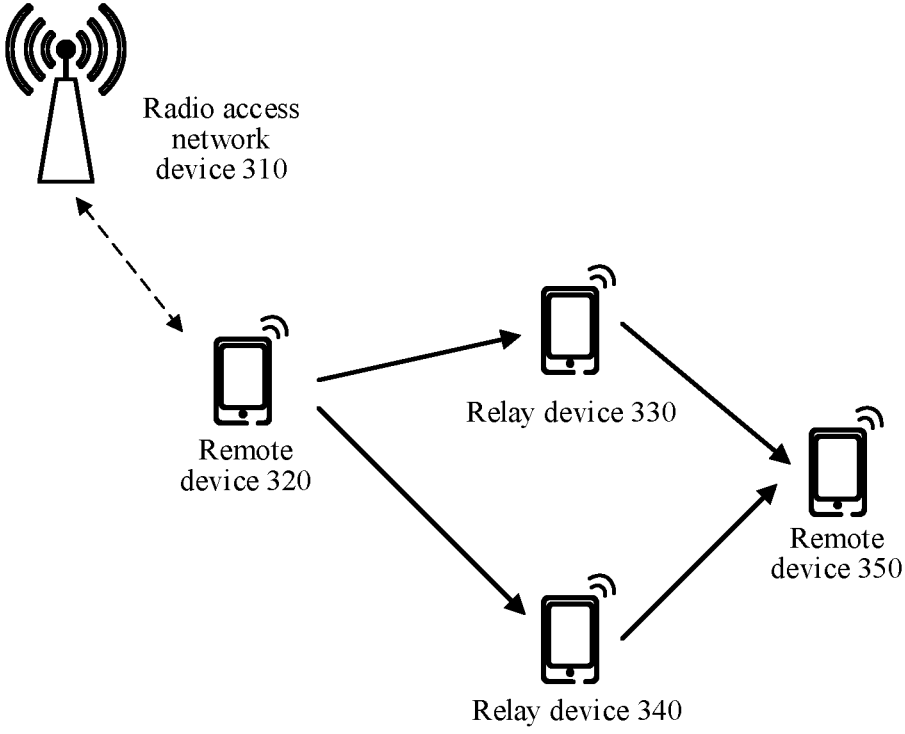
FIG. 3 is a schematic diagram of another scenario according to an embodiment.
FIG. 4 is a schematic diagram of a possible control plane protocol stack according to an embodiment.

FIG. 3 is a diagram of an architecture of another communication system according to an embodiment of this application. This scenario is a device-to-device relay communication system. In this scenario, a remote device 320 first receives data from a radio access network device 310 through a Uu link. Then, the remote device 320 transmits the data to a remote device 350. The remote device 320 performs sidelink communication with a relay device 330 and a relay device 340 through a PC5 interface, and the remote device 350 also performs sidelink communication with the relay device 330 and the relay device 340 through the PC5 interface.

For example, the remote device and the relay device each are a device that has a wireless transceiver function, for example, may be a vehicle-mounted communication apparatus, a vehicle-mounted communication chip, a roadside unit, or a communication apparatus in a roadside unit, or may be user equipment, an access terminal, a subscriber unit, a subscriber station, a mobile station, a mobile console, a remote station, a remote terminal, a mobile device, a user terminal, a terminal, a wireless communication device, a user agent, or a user apparatus. The remote device and the relay device each may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a 5G network, or a terminal device in a future evolved public land mobile network (PLMN). This is not limited in embodiments of this application.

For example, the radio access network device may be a device configured to communicate with the remote device or the relay device, and may be any device that has a transceiver function. The radio access network device may be a device that provides a wireless communication function service for a terminal device, and is usually located on a network side, and includes but is not limited to: a next generation base station (gNB) in a 5th generation (5G) communication system, an evolved NodeB (eNB) in an LTE system, a radio network controller (RNC), a NodeB (NB), a device that provides a wireless communication service for a terminal device in a V2X communication system, a radio controller in a cloud radio access network (CRAN) scenario, a relay station, a vehicle-mounted device, a wearable device, a network device in a future evolved network, and the like. A specific implementation is not limited in embodiments of this application.

In addition, in embodiments of this disclosure, the radio access network device may be a device in a RAN, in other words, a RAN node that connects a remote device to a wireless network. By way of example, and not limitation, the radio access network device is a base station, and the following may be listed: a gNB, a transmission reception point (TRP), a transmitting point (TP), an evolved NodeB (eNB), a radio network controller (RNC), a NodeB (NB), a base station controller (BSC), a base transceiver station (BTS), a home base station (for example, a home evolved NodeB or a home NodeB (HNB)), a baseband unit (BBU), or the like. In a network structure, the radio access network device may include a central unit (CU) node, a distributed unit (DU) node, a RAN device including a CU node and a DU node, or a RAN device including a CU control plane node (CU-CP node), a CU user plane node (CU-UP node), and a DU node.

The radio access network device serves a cell. The terminal device communicates with the base station on a transmission resource (for example, a frequency domain resource, or in other words, a spectrum resource) used for the cell. The cell may be a cell corresponding to the base station. The cell may belong to a macro base station, or a base station corresponding to a small cell. The small cell herein may include a metro cell, a micro cell, a pico cell, a femto cell, and the like. These small cells have features of a small coverage range and low transmit power, and are suitable for providing a high-rate data transmission service.

For example, the foregoing communication scenario may be applied to various communication systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) system, a new radio (NR) system, or a future evolved wireless communication system.

The communication system in embodiments of this disclosure may be further applicable to a user equipment-to-network (U2N) relay technology. Network elements in a U2N relay system include a radio access network device, a relay UE, and a remote UE. There is a connection between the radio access network device and the relay UE, and there is a connection between the relay UE and the remote UE. The relay UE may help the remote UE access a network to obtain a service. For example, the relay UE may help the remote UE obtain data for the remote UE by using the radio access network device, and forward the data to the remote UE, or the relay UE obtains data from the remote UE and forwards the data to the radio access network device.

A U2N relay service may be provided in two manners: a PC5 interface based manner and a Uu interface based manner. A PC5 interface is an interface defined based on a sidelink (SL). Through such an interface, communication devices (for example, terminal devices) may directly communicate with each other. The PC5 interface may be used out of coverage (OOC) and in coverage (IC), but only an authorized communication device can use the PC5 interface for transmission.

FIG. 4 is a schematic diagram of a control plane protocol stack in a U2N relay communication system according to an embodiment. As shown in FIG. 4, a control plane protocol stack of a remote UE includes a non-access stratum (NAS), a PDCP layer, and a radio resource control (RRC) layer that are between the remote UE and a core network (NGC), and an SL-RLC layer, an SL-MAC layer, and an SL-PHY layer that are connected to a relay UE through a sidelink. A control plane protocol stack of the relay UE includes an SL-RLC layer, an SL-MAC layer, and an SL-PHY layer that are connected to the remote UE through the sidelink, and an RLC layer, a MAC layer, a PHY layer, and an adaptation (Adap.) layer that are connected to a gNB through a Uu interface. A control plane protocol stack of the gNB includes an adaptation layer, an RLC layer, a MAC layer, and a PHY layer that are connected to the relay UE through the Uu interface, and a layer 1/layer 2 (Layer 1/Layer 2, L1/L2) layer, a stream control transmission protocol (SCTP) layer, an internet protocol (IP) layer, and an NG application protocol (NGAP) layer that are used for information exchange with the NGC. A control plane protocol stack of the NGC includes a NAS layer, an RRC layer, a PDCP layer, an L1/L2 layer, an SCTP layer, an IP layer, and an NGAP layer.

Figure 5:
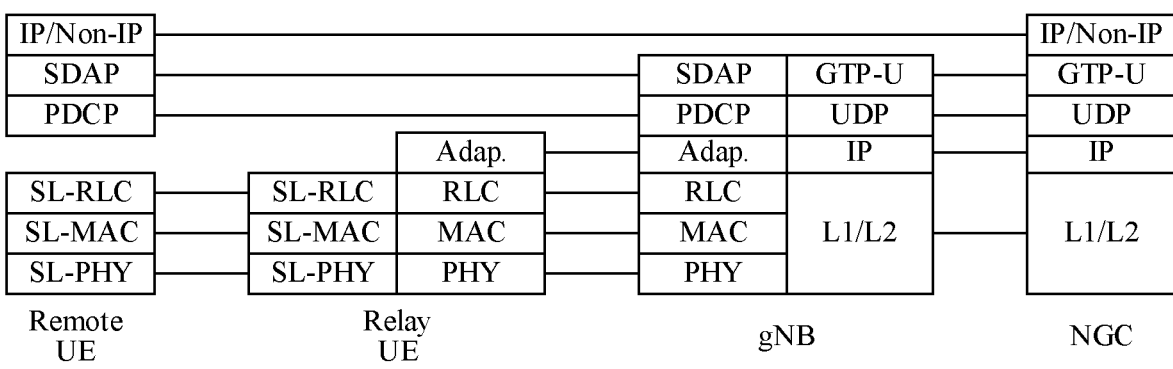
FIG. 5 is a schematic diagram of a possible user plane protocol stack according to an embodiment.

FIG. 5 is a schematic diagram of a user plane protocol stack in a U2N relay communication system according to an embodiment. As shown in FIG. 5, a user plane protocol stack of a remote UE includes an IP/Non-IP layer between the remote UE and an NGC, and an SL-RLC layer, an SL-MAC layer, and an SL-PHY layer that are connected to a relay UE through a sidelink. A user plane protocol stack of the relay UE includes an SL-RLC layer, an SL-MAC layer, and an SL-PHY layer that are connected to the remote UE through the sidelink, and an RLC layer, a MAC layer, a PHY layer, and an adaptation layer that are connected to a gNB through a Uu interface. A user plane protocol stack of the gNB includes an adaptation layer, an RLC layer, a MAC layer, and a PHY layer that are connected to the relay UE through the Uu interface, and an L1/L2 layer, a user datagram protocol (UDP) layer, an IP layer, and a general packet radio service tunneling protocol (GTP-U) layer that are used for information exchange with the NGC. A user plane protocol stack of the NGC includes an L1/L2 layer, a UDP layer, an IP layer, a GTP-U layer, and an IP/Non-IP layer. The SL-RLC layer, the SL-MAC layer, and the SL-PHY layer of the remote UE exchange information with the SL-RLC layer, the SL-MAC layer, and the SL-PHY layer of the relay UE through a PC5 interface. The PDCP layer of the remote UE establishes an end-to-end connection to the gNB through the Uu interface to exchange information. The RLC layer, the MAC layer, and the PHY layer of the relay UE exchange information with the RLC layer, the MAC layer, and the PHY layer of the gNB through the Uu interface.

It should be understood that, in the protocol stacks in FIG. 4 and FIG. 5, there may alternatively be peer adaptation layers between the remote UE and the relay UE. To be specific, there may be one adaptation layer on each of the peer SL-RLC layers between the remote UE and the relay UE.

Figure 6:
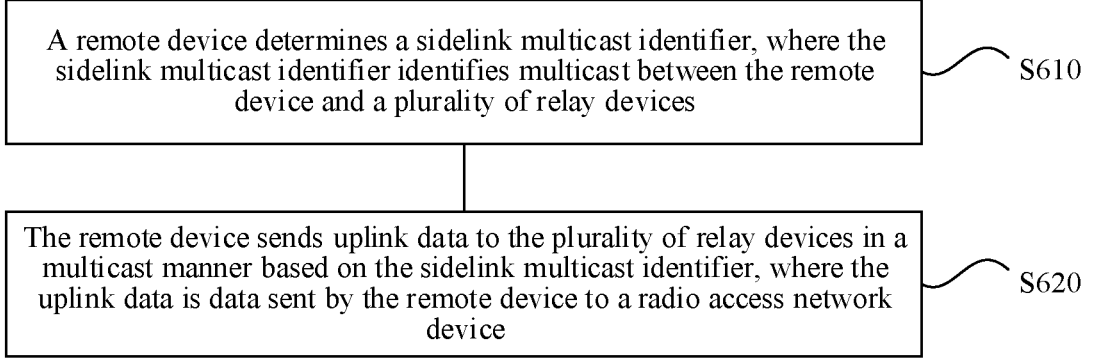
FIG. 6 is a schematic flowchart of a data transmission method according to an embodiment.

FIG. 6 is a schematic diagram of a data transmission method according to an embodiment. It should be understood that an application scenario of the data transmission method may be FIG. 2, to be specific, there is an indirect link between a remote device and a radio access network device, and at least one relay device is included in the application scenario. As shown in FIG. 6, the method specifically includes the following steps.

S610: A remote device determines a sidelink multicast identifier, where the sidelink multicast identifier identifies multicast between the remote device and a plurality of relay devices.

S620: The remote device sends uplink data to the plurality of relay devices in a multicast manner based on the sidelink multicast identifier, where the uplink data is data sent by the remote device to a radio access network device.

For example, when the remote device sends the uplink data to the radio access network device in the multicast manner, sidelink multicast needs to be first created. The multicast is for transmitting the uplink data between the remote device and the plurality of relay devices, and the sidelink multicast identifier is allocated to the multicast. Usually, the radio access network device may indicate the remote device to create the sidelink multicast. For example, if the radio access network device configures more than one relay device for the remote device, the radio access network device may indicate the remote device to transmit the uplink data in the sidelink multicast manner. Alternatively, when a current service is a high-reliability and low-latency service, the radio access network device may indicate the remote device to transmit the uplink data in the sidelink multicast manner. Alternatively, the sidelink multicast may be created by the remote device. For example, when a reliability requirement of an uplink data transmission service on a Uu link of the remote device is high, and a current unicast communication manner cannot meet the service requirement, the remote device may determine to initiate sidelink multicast communication to send the uplink data in the sidelink multicast manner. In other words, when the remote device triggers establishment of the sidelink multicast, the establishment is usually triggered inside the remote device or at an access stratum (AS) based on service data quality of service (QoS). In other words, when a current transmission mechanism cannot meet a QoS requirement of a current service, the sidelink multicast is created.

For example, when the remote device creates the sidelink multicast, the sidelink multicast identifier may be allocated to the sidelink multicast. To be specific, the AS of the remote device sends indication information to an upper layer, where the indication information indicates the upper layer to allocate the sidelink multicast identifier. After allocating the sidelink multicast identifier, the upper layer further indicates the sidelink multicast identifier to the AS. In this case, the allocation of the sidelink multicast identifier is completed.

In an optional solution, the sidelink multicast identifier may alternatively be allocated by the AS. To be specific, when the remote device transmits the uplink data based on the sidelink multicast communication, the AS also has a sidelink multicast identifier management function. Then, after allocating the sidelink multicast identifier, the AS may further indicate the allocated sidelink multicast identifier to the upper layer.

Optionally, the upper layer of the AS may be a vehicle-to-everything (V2X) layer or a PC5-S layer.

Optionally, the sidelink multicast identifier may be an L2 identifier.

It should be understood that the radio access network device indicating the remote device to create the sidelink multicast may be that the radio access network device directly sends the indication information to the remote device to indicate the remote device to create the multicast, or may be that the radio access network device directly sends a configuration message to the remote device, and when receiving the configuration message, the remote device knows that the sidelink multicast needs to be created.

The remote device creating the sidelink multicast may alternatively be understood as that the remote device allocates the sidelink multicast identifier, or the remote device sends the uplink data to the relay device in the sidelink multicast manner.

Optionally, the configuration message is usually an RRC reconfiguration message. The configuration message carries a sidelink bearer configuration. The sidelink bearer configuration is for configuring a sidelink multicast bearer between the remote device and the plurality of relay devices.

For example, when receiving the configuration message, the remote device may establish the sidelink multicast bearer between the remote device and the plurality of relay devices based on information in the sidelink bearer configuration carried in the configuration message.

It should be understood that the information in the sidelink bearer configuration includes sidelink bearer indication information. The sidelink bearer indication information indicates the sidelink multicast bearer. In addition, the sidelink bearer configuration may further include an SL-RLC entity configuration, a logical channel configuration, and the like.

It should be understood that the sidelink bearer indication information may directly include information about the sidelink multicast bearer, or a function of the sidelink bearer indication information or information carried in the sidelink bearer indication information may directly or indirectly indicate/identify the sidelink multicast bearer. The sidelink bearer indication information falls within the protection scope of embodiments of this application provided that the sidelink bearer indication information can indicate the sidelink multicast bearer. This is not excessively limited herein.

Optionally, the sidelink multicast bearer indication information may alternatively be a logical channel identifier, for example, an LCD, may be PC5 bearer indication information, or may be a sidelink configuration bearer index.

Optionally, the configuration message may further include a Uu bearer identifier (referred to as a first Uu bearer identifier below). The Uu bearer identifier identifies a data radio bearer (DRB) (referred to as a first DRB below) between the remote device and the radio access network device. There is a correspondence between the sidelink bearer indication information and the first Uu bearer identifier. In other words, there is a correspondence between the sidelink multicast bearer and the first DRB.

The correspondence between the sidelink bearer indication information and the first Uu bearer identifier may be a one-to-one correspondence. To be specific, one piece of sidelink bearer indication information corresponds to one first Uu bearer identifier. In other words, one sidelink multicast bearer corresponds to one first DRB. Alternatively, a plurality of first Uu bearer identifiers correspond to one piece of sidelink bearer indication information. In other words, a plurality of first DRBs correspond to one sidelink multicast bearer.

When one sidelink multicast bearer corresponds to a plurality of first DRBs, an adaptation layer of the remote device may carry a first DRB identifier, so that during data transmission, the relay device knows a specific first DRB that needs to be sent by using the sidelink multicast bearer.

The sidelink multicast bearer is a sidelink bearer used by the remote device to send the uplink data to the relay device in the multicast manner, that is, includes an SL-RLC, an SL-MAC, and an SL-PHY, and is usually referred to as an SL RLC bearer.

When the radio access network device directly sends the indication information to the remote device or the remote device creates the multicast, the radio access network device also needs to send the configuration message to the remote device. However, in this case, the remote device may first send the sidelink multicast identifier to the radio access network device, that is, the remote device sends a second message to the radio access network device, where the second message carries the sidelink multicast identifier. In other words, after the radio access network device receives the sidelink multicast identifier, the radio access network device is triggered to send the configuration message to the remote device.

Optionally, the indication information sent by the radio access network device to the remote device may be a Uu RRC message. The Uu RRC message may alternatively be an RRC reconfiguration message.

When receiving the configuration message, the remote device may associate the sidelink multicast bearer with the first DRB based on the sidelink bearer configuration and the first Uu bearer identifier in the configuration. Therefore, when the remote device needs to transmit the uplink data to the radio access network device in the sidelink multicast manner, the remote device may know a specific sidelink multicast bearer through which data in a PDCP entity carried on the first DRB is sent, to implement efficient and accurate data transmission.

After creating the sidelink multi cast and allocating the identifier to the sidelink multicast, the remote device needs to send the sidelink multicast identifier to each relay device, so that the relay device receives, based on the sidelink multicast identifier, data in the multicast corresponding to the sidelink multicast identifier.

The sidelink multicast identifier may be sent by the remote device to the relay device, that is, the remote device sends a first message to the relay device, where the message carries the sidelink multicast identifier. Alternatively, the sidelink multicast identifier may be sent by the radio access network device to the relay device, to be specific, after the radio access network device receives the sidelink multicast identifier from the remote device, the radio access network device sends the first message to the relay device, where the message carries the sidelink multicast identifier.

For example, in this embodiment, unicast connections have been established between the remote device and the relay device, and between the relay device and the radio access network device. Therefore, when sending the sidelink multicast identifier to the relay device, the remote device may perform transmission by using the established sidelink unicast connection between the remote device and the relay device.

Usually, the first message may carry the sidelink bearer indication information and the Uu bearer identifier (referred to as a first Uu bearer identifier below). Similarly, the first Uu bearer identifier identifies a DRB (referred to as a first DRB below) between the remote device and the radio access network device. The sidelink bearer indication information indicates the sidelink multicast bearer. There is a correspondence between the sidelink multicast bearer and the first DRB. The reason is to enable the relay device to know a specific sidelink multicast bearer that is for receiving the uplink data sent by the remote device, and a specific second DRB, of the relay device, that is for sending the data to the radio access network device. It should be noted that the second DRB herein is a DRB between the relay device and the radio access network device. To distinguish the DRB of the relay device from the DRB of the remote device, the following uses "first DRB" to represent the DRB between the remote device and the radio access network device, and uses "second DRB" to represent the DRB between the relay device and the radio access network device.

It should be understood that, in embodiments of this disclosure, unless otherwise specified, terms such as "first" and "second" are merely used to distinguish between different individuals. For example, "first Uu bearer identifier" and "second Uu bearer identifier" in embodiments of this application are identifiers of two mutually independent or different Uu bearers. There is no other limitation except this.

Specifically, there is a sidelink unicast bearer between the remote device and the relay device, and communication may be performed based on the sidelink unicast bearer. In this case, the remote device sends a correspondence between sidelink unicast bearer indication information and the sidelink multicast bearer indication information to the relay device, or sends the correspondence between the sidelink multicast bearer indication information and the first DRB identifier of the remote device. In this way, the relay device corresponds the sidelink unicast bearer indication information/the first DRB identifier to a second DRB identifier of the relay device. Therefore, after receiving, from the sidelink multicast bearer, the uplink data sent by the remote device, the relay device knows a specific DRB that is for sending the uplink data to the radio access network device.

The sidelink unicast bearer indication information may directly include information about the sidelink unicast bearer, or a function of the sidelink unicast bearer indication information or information carried in the sidelink unicast bearer indication information may directly or indirectly indicate/identify the sidelink unicast bearer. The sidelink unicast bearer indication information falls within the protection scope of embodiments of this application provided that the sidelink unicast bearer indication information can indicate the sidelink unicast bearer. This is not excessively limited herein.

Optionally, when there is no information about sidelink unicast communication between the remote device and the relay device, and when the relay device receives the correspondence between the sidelink multicast bearer indication information and the first Uu bearer identifier from the remote device, the relay device also receives a correspondence between the first DRB identifier and the second DRB identifier from the radio access network device. Therefore, when receiving, from the sidelink multicast bearer, the uplink data sent by the remote device, the relay device knows a specific second DRB that is for sending the uplink data to the radio access network device.

It should be understood that when the sidelink multicast identifier is sent by the radio access network device to the relay device, the remote device first sends the sidelink multicast identifier to the radio access network device. To be specific, the remote device sends the second message to the radio access network device. The second message carries the sidelink multicast identifier. The multicast corresponding to the sidelink multicast identifier is used by the remote device to transmit the uplink data.

Optionally, the second message may carry indication information, that is, second indication information. The indication information indicates that the multicast corresponding to the sidelink multicast identifier is used by the remote device to transmit the uplink data.

Optionally, the second message may be a Uu RRC message. To be specific, the message is an RRC message between the remote device and the radio access network device. Alternatively, the Uu RRC message may be a sidelink UE information NR (SidelinkUEInformationNR) message.

It should be understood that, when the sidelink multicast identifier is sent by the remote device to the relay device, there may be a possible implementation. To be specific, after receiving the multicast identifier, the relay device may send the sidelink multicast identifier to the radio access network device. In other words, the relay device generates a third message, and sends the third message to the radio access network device. The third message carries the sidelink multicast identifier. The multicast corresponding to the sidelink multicast identifier is used by the remote device to transmit the uplink data. After the radio access network device receives the sidelink multicast identifier, the radio access network device may also send a configuration message to the relay device. The configuration message includes the sidelink bearer configuration and a second Uu bearer identifier. The sidelink bearer configuration includes sidelink bearer indication information. The sidelink bearer indication information indicates the sidelink multicast bearer. In addition, the sidelink bearer configuration may further include an SL-RLC entity configuration, a logical channel configuration, and the like.

The second Uu bearer identifier identifies the second DRB between the relay device and the radio access network device. There is a correspondence between the second Uu bearer identifier and the sidelink bearer indication information. In other words, there is a correspondence between the sidelink multicast bearer and the second DRB.

It should be understood that, in this embodiment, the correspondence between the sidelink bearer indication information and the second Uu bearer identifier may be a one-to-one correspondence. To be specific, one piece of sidelink bearer indication information corresponds to one second Uu bearer identifier. In other words, one sidelink multicast bearer corresponds to one second DRB. Alternatively, one second Uu bearer identifier corresponds to a plurality of pieces of sidelink bearer indication information. In other words, one second DRB corresponds to a plurality of sidelink multicast bearers. Alternatively, a plurality of second Uu bearer identifiers correspond to one piece of sidelink bearer indication information. In other words, a plurality of second DRBs correspond to one sidelink multicast bearer.

When a plurality of sidelink multicast bearers correspond to one second DRB or that one sidelink multicast bearer corresponds to a plurality of second DRBs is supported, an adaptation layer between the relay device and the radio access network device may carry the first DRB identifier, so that during data transmission, the radio access network device knows a specific first DRB that needs to be sent by using the sidelink multicast bearer.

Optionally, the third message may carry indication information, that is, the second indication information. The indication information indicates that the multicast determined based on the sidelink multicast identifier is used by the remote device to transmit the uplink data.

Optionally, the third message may be a Uu RRC message. To be specific, the message is an RRC message between the relay device and the radio access network device. For example, the Uu RRC message may alternatively be a SidelinkUEInformationNR message.

Both the second message and the third message may additionally carry the second indication information indicating that the multicast determined based on the sidelink multicast identifier is used by the remote device to transmit the uplink data. A reason is as follows.

In an existing mechanism, the remote device reports multicast, unicast, or an identifier corresponding to unicast, to the radio access network device by using an RRC uplink message. However, in this embodiment, the existing mechanism may be reused, to be specific, an existing SidelinkUE-InformationNR message may be reused. However, a problem is that after receiving the sidelink multicast identifier, the radio access network device does not distinguish between multicast established by the remote device and multicast established at a V2X layer. In this case, in addition to reusing an existing information element of the existing SidelinkUEInformationNR message, the message may further carry additional indication information, or a new information element introduced into the existing SidelinkUEInformationNR message indicates the sidelink multicast identifier, to indicate that the sidelink multicast is multicast used by the remote device to transmit the uplink data.

Optionally, the existing mechanism may not be reused. In this case, a new message needs to be introduced. The message is for reporting the sidelink multicast identifier. After receiving the message, the radio access network device learns that the sidelink multicast is multicast for transmitting the uplink data by the remote device.

When the remote device determines the sidelink multicast identifier, sends the sidelink multicast identifier to the relay device and the radio access network device, and receives the sidelink bearer configuration sent by the radio access network device, the remote device may send the uplink data to the radio access network device in the multicast manner based on the sidelink multicast identifier by using a plurality of relay devices, to implement uplink data transmission with high reliability and high transmission efficiency.

In the communication system, both a sidelink unicast connection bearer and a sidelink multicast bearer exist between the remote device and the relay device, and the sidelink unicast connection bearer and the sidelink multicast bearer both have correspondences with the first DRB of the remote device. In this case, a transmission manner between the remote device and the plurality of relay devices may be switched from multicast communication to unicast communinication, or from unicast communication to multicast communication. For example, when a current transmission manner between the remote device and the plurality of relay devices is unicast communication, but a service requirement changes to high reliability, the unicast communication needs to be switched to multicast communication. Alternatively, when a current transmission manner is multicast communication and a service requirement does not emphasize reliability, or different data needs to be transmitted, the multicast communication may be switched to unicast communication. Alternatively, decision is made based on a change of a communication environment, for example, when a sidelink status is worse, switching from unicast to multicast may be performed, and when the sidelink status is better, switching from multicast to unicast may be performed.

Optionally, the remote device may switch from multicast to unicast or from unicast to multicast based on a requirement of the remote device and a service or based on determining of a sidelink status.

Optionally, the remote device may receive indication information, that is, third indication information, from the radio access network device. The indication information indicates that the transmission manner between the remote device and the plurality of relay devices may be switched from multicast communication to unicast communication, or may be switched from unicast communication to multicast communication.

Optionally, the third indication information may be a Uu RRC message. Alternatively, the radio access network device sends a Uu MAC CE to the relay device, and the relay device generates a PC5 MAC CE and sends the PC5 MAC CE to the remote device.

When the remote device reserves both the sidelink unicast bearer and the sidelink multicast bearer, the radio access network device may flexibly adjust an uplink data transmission manner by sending the indication information to the remote device.

With reference to FIG. 7 to FIG. 11, the following describes an uplink transmission method in embodiments of this application by way of example.

Figure 7:
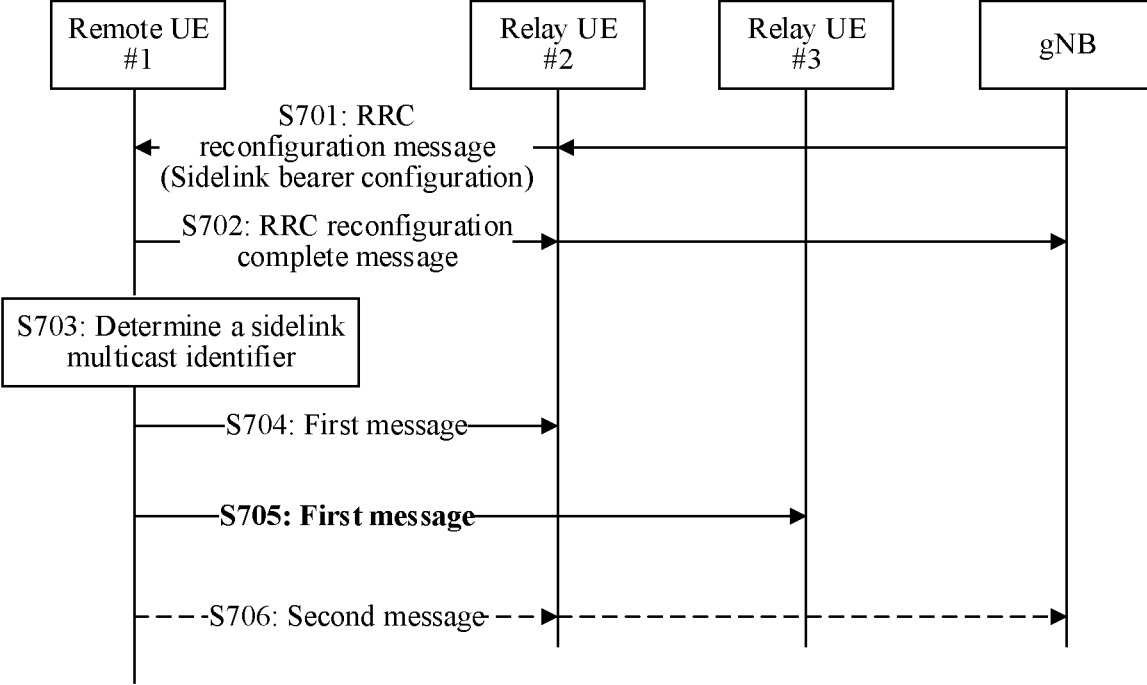
FIG. 7 is another schematic flowchart of a data transmission method according to an embodiment.

FIG. 7 is a schematic flowchart of a data transmission method according to an embodiment of this application. As shown in FIG. 7, the method includes a remote UE #1, a relay UE #2, a relay UE #3, and a base station gNB. It should be understood that, in FIG. 7, the remote UE #1 is a remote device, there are two relay devices: the relay UE #2 and the relay UE #3, and a radio access network device is the gNB.

It should be understood that an application scenario of the method may be FIG. 2. To be specific, in FIG. 2, the radio access network device 210 is the gNB, the remote device 240 is the remote UE #2, the relay device 320 is the relay UE #2, and the relay device 330 is the relay UE #3. The specific method in FIG. 7 includes the following steps.

S701: The remote UE #1 receives an RRC reconfiguration message sent by the gNB.

S702: The remote UE #1 sends an RRC reconfiguration complete message to the gNB.

Specifically, after the remote UE #1 separately establishes unicast connections to the relay UE #2 and the relay UE #3, to implement multicast communication between the remote UE #1 and the relay UE #2 and between the remote UE #1 and the relay UE #3, the gNB sends the RRC reconfiguration message (namely, a configuration message) to the remote UE #1. In other words, the gNB determines that the remote UE #1 sends uplink data to the relay UE #2 and the relay UE #3 in a sidelink multicast manner. The RRC reconfiguration message carries a sidelink bearer configuration. Information in the sidelink multicast bearer configuration is for configuring a sidelink multicast bearer used by the remote UE #1 to send the uplink data to the relay UE #1 and the relay UE #2. When receiving the sidelink multicast bearer configuration sent by the gNB, the remote UE #1 may send the RRC reconfiguration complete message to the gNB. The RRC reconfiguration complete message notifies the gNB that the remote UE #1 has received the sidelink multicast bearer configuration.

It should be understood that, in this embodiment, the uplink data is transmitted in the scenario shown in FIG. 2. To be specific, there are only a plurality of indirect links between the gNB and the remote UE #2. In this case, when the gNB needs to send a message to the remote UE #1, because there is no Uu link, the gNB needs the relay UE to forward the message, to be specific, the gNB needs the relay UE #1 or the relay UE #2 to forward the message. For a specific implementation, refer to the protocol stack shown in FIG. 4. To be specific, after passing through the PDCP and the adaptation layer, the RRC reconfiguration message of the gNB passes through the RLC layer, the MAC layer, and the PHY layer downward, and is forwarded to the Uu interface of the relay UE through the Uu interface. After receiving the message, the Uu interface of the relay UE forwards the message to the PC5 interface, and the message is transmitted to the remote UE #1 through the PC5 interface.

It should be understood that, in this embodiment, the RRC reconfiguration message is first sent by the gNB to the relay UE #2, and the relay UE #2 forwards the message to the remote UE #1. Similarly, the remote UE #1 forwards the RRC reconfiguration complete message to the relay UE #2, and the relay UE #2 transmits the message to the gNB.

Optionally, the RRC reconfiguration message may alternatively be first sent by the gNB to the relay UE #3, and the relay UE #3 forwards the message to the remote UE #1. Similarly, the remote UE #1 forwards the RRC reconfiguration complete message to the relay UE #3, and the relay UE #3 transmits the message to the gNB.

Optionally, when the remote UE #1 sends the RRC reconfiguration complete message to the gNB, the gNB may perform indication, to be specific, the gNB indicates a specific relay UE through which the message is forwarded. Alternatively, preconfiguration may be performed, to be specific, a specific relay UE from which the RRC reconfiguration message is received forwards the RRC reconfiguration complete message. This is not limited herein.

Optionally, the RRC reconfiguration message may further carry indication information. The indication information clearly indicates that the sidelink bearer configuration is for the multicast communication between the remote UE #1 and the relay UE #2 and between the remote UE #1 and the relay UE #3.

The RRC reconfiguration message includes the sidelink bearer configuration, and may further include the indication information. In other words, when the RRC reconfiguration message includes the sidelink bearer configuration but does not include the indication information, after receiving the sidelink bearer configuration, the remote UE #1 learns that the uplink data needs to be sent to the relay UE by multicast communication. When the RRC reconfiguration message includes both the sidelink bearer configuration and the indication information, the remote UE #1 may directly learn, from the indication information, that the uplink data needs to be sent to the relay UE by multicast communication.

Optionally, the indication information may be a Uu RRC message, and the Uu RRC message may alternatively be the RRC reconfiguration message.

The sidelink bearer configuration may include sidelink bearer indication information. The sidelink bearer indication information indicates the sidelink multicast bearer. The RRC reconfiguration message may further carry a Uu bearer identifier. The Uu bearer identifier identifies a first DRB between the remote device and the radio access network device. There is a correspondence between the sidelink multicast bearer and the first DRB. The sidelink multicast bearer may also be understood as a PC5 bearer.

For example, uplink data transmitted by the first DRB of the remote UE #1 needs to be forwarded to the relay UE by using a sidelink RLC bearer corresponding to the first DRB. In this case, a correspondence between the first DRB and the sidelink RLC bearer is the foregoing correspondence.

Optionally, the Uu bearer identifier may be a data radio bearer (DRB) identifier.

Optionally, the mapping relationship may alternatively be implemented by an adaptation layer, for example, a backhaul adaptation protocol (BAP) layer.

Optionally, the sidelink multicast bearer indication information may alternatively be a logical channel identifier, for example, an LCID, may be PC5 bearer indication information, or may be a sidelink configuration bearer index.

S703: The remote UE #1 determines a sidelink multicast identifier.

Specifically, after receiving the RRC reconfiguration message, the remote UE #1 knows that the uplink data needs to be transmitted to the gNB in a multicast communication manner. In this case, an AS of the remote UE #1 creates sidelink multicast, and an upper layer of the AS allocates the sidelink multicast identifier to the multicast communication. To be specific, the AS of the remote UE #1 may send indication information to the upper layer. The indication information indicates the upper layer to allocate the sidelink multicast identifier. After allocating the sidelink multicast identifier, the upper layer may also send the sidelink multicast identifier to the AS of the remote UE #1.

It should be understood that the foregoing upper layer may be a V2X layer or a PC5-S layer.

Optionally, the multicast identifier may be an L2 identifier.

It should be noted that step S703 may alternatively be performed before step S702. In other words, an execution sequence of step S702 and step S703 is not limited in this embodiment.

S704: The remote UE #1 sends a first message to the relay UE #2.

S705: The remote UE #1 sends the first message to the relay UE #3.

For example, after allocating the sidelink multicast identifier, the remote UE #1 separately sends the first message to the relay UE #2 and the relay UE #3 through the first established unicast connection. The first message carries the sidelink multicast identifier. The multicast corresponding to the sidelink multicast identifier is used by the remote UE #1 to transmit the uplink data.

Optionally, the first message further includes the sidelink bearer indication information and a first Uu bearer identifier. There is a correspondence between the first Uu bearer identifier and the sidelink bearer indication information. The first Uu bearer identifier identifies a DRB (referred to as a first DRB below) between the remote UE #1 and the gNB. To be specific, after receiving a Uu PDCP PDU by using the sidelink multicast bearer, the relay UE #2 or the relay UE #3 can forward the Uu PDCP PDU to a Uu interface, and data is forwarded to the gNB by using a DRB (referred to as a second DRB below) between the relay UE and the gNB. To be specific, the data is forwarded to a PDCP entity of the gNB by using the second DRB of the relay UE #2 or the relay UE #3.

Optionally, the mapping relationship may alternatively be implemented by an adaptation layer, for example, a BAP layer.

Optionally, the sidelink multicast bearer indication information may be a logical channel identifier, for example, an LCD, may be PC5 bearer indication information, or may be a sidelink configuration bearer index.

Optionally, the first message may be an SL RRC message, to be specific, an RRC message between the remote UE #1 and the relay UE.

S706: The remote UE #2 sends a second message to the gNB.

For example, the remote UE #2 may send the second message to the gNB. The second message also carries the sidelink multicast identifier. The multicast corresponding to the sidelink multicast identifier is used by the remote UE #1 to transmit the uplink data.

Optionally, the third RRC message may further carry indication information. The indication information indicates that the multicast is used by the remote UE #1 to transmit the uplink data to the relay UE #2 and the relay UE #3.

In this embodiment, the second message is first sent by the remote UE #1 to the relay UE #2, and the relay UE #2 forwards the message to the gNB.

Optionally, the second message may alternatively be first sent by the remote UE #1 to the relay UE #3, and the relay UE #3 forwards the message to the gNB. This is not limited herein.

Optionally, the second message may be a Uu RRC message, to be specific, an RRC message between the remote UE #1 and the gNB. The Uu RRC message may alternatively be a SidelinkUEInformationNR message.

It should be understood that S706 is an optional step. In S701, the gNB has sent the sidelink bearer configuration to the remote UE #1. In other words, when delivering the sidelink bearer configuration, the gNB already knows that the remote UE #1 is to transmit the uplink data to the relay UE #2 and the relay UE #3 in a multicast communication manner. In this case, the remote UE #1 may report the sidelink multicast identifier to the gNB, or may not report the sidelink multicast identifier. However, when the gNB needs to use the sidelink multicast identifier to perform another service, the remote UE #1 needs to report the sidelink multicast identifier to the gNB.

When S706 exists in this embodiment, S706 may be performed after S704 and S705, or may be performed before S704 and S705, or may be simultaneously performed. In addition, S704 may be performed before S705, or may be performed after S705, or may be simultaneously performed. In other words, a sequence of performing the three steps S704, S705, and S706 is not limited.

In this embodiment, the remote UE #1 receives an indication from the gNB to allocate the sidelink multicast identifier, and separately sends the sidelink multicast identifier to each relay UE. Therefore, when the remote UE sends the uplink data by using the sidelink multicast identifier, the relay UE may receive, based on the first received sidelink multicast identifier, the data in the multicast corresponding to the sidelink multicast identifier, and forward the data to the gNB, to improve uplink data transmission efficiency.

Figure 8:
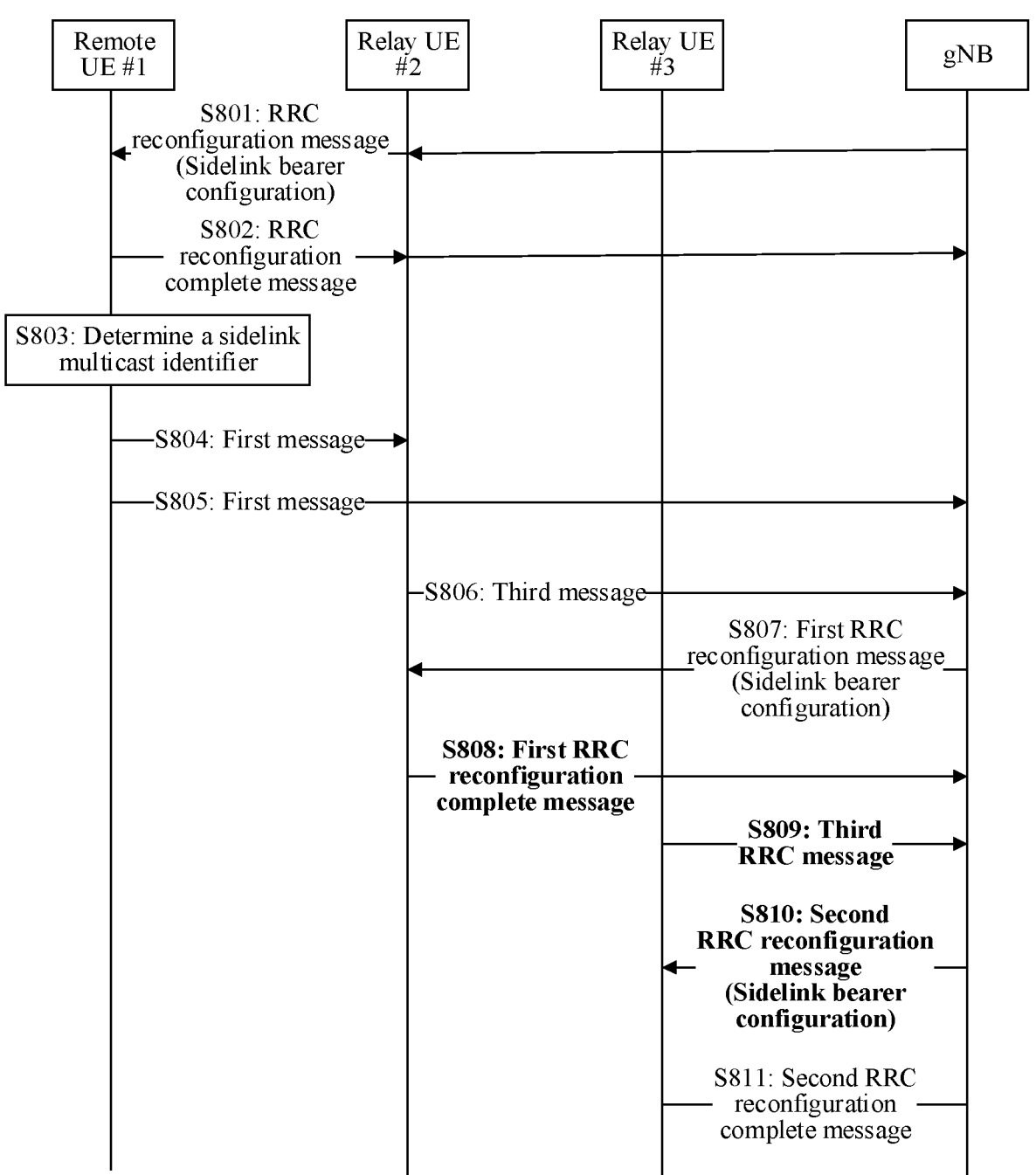
FIG. 8 is another schematic flowchart of a data transmission method according to an embodiment.

FIG. 8 is a schematic flowchart of a data transmission method according to an embodiment. As shown in FIG. 8, the method includes a remote UE #1, a relay UE #2, a relay UE #3, and a base station gNB. It should be understood that, in FIG. 8, the remote UE #1 is a remote device, there are two relay devices: the relay UE #2 and the relay UE #3, and a radio access network device is the gNB.

It should be understood that an application scenario of the method may be FIG. 2. To be specific, in FIG. 2, the radio access network device 210 is the gNB, the remote device 240 is the remote UE #2, the relay device 220 is the relay UE #2, and the relay device 230 is the relay UE #3. The specific method in FIG. 8 includes the following steps.

S801: The remote UE #1 receives an RRC reconfiguration message sent by the gNB.

S802: The remote UE #1 sends an RRC reconfiguration complete message to the gNB.

S803: The remote UE #1 determines a sidelink multicast identifier.

S804: The remote UE #1 sends a first message to the relay UE #2.

S805: The remote UE #1 sends the first message to the relay UE #3.

For example, for specific implementations of step S801 to step S805, refer to step S701 to step S705. Details are not described herein again.

S806: The relay UE #2 sends a third message to the gNB.

S807: The relay UE #2 receives a first RRC reconfiguration message sent by the gNB.

S808: The relay UE #2 sends a first RRC reconfiguration complete message to the gNB.

S809: The relay UE #3 sends the third message to the gNB.

S810: The relay UE #3 receives a second RRC reconfiguration message sent by the gNB.

S811: The relay UE #3 sends a second RRC reconfiguration complete message to the gNB.

For example, in the foregoing steps S804 and S805, each relay device receives the sidelink multicast identifier sent by the remote UE #1. In this case, the relay device knows that the remote UE #1 needs to perform multicast communication subsequently. Therefore, the relay device uses the sidelink multicast identifier as one piece of service information of the relay device, generates the third message, and sends the third message to the gNB. To be specific, the relay UE #2 sends the third message to the gNB, and the relay UE #3 sends the third message to the gNB. The third message carries the sidelink multicast identifier, and multicast corresponding to the sidelink multicast identifier is used by the remote UE #1 to transmit uplink data.

Optionally, the third message may be a Uu RRC message. To be specific, the message is an RRC message between the relay UE and the gNB. The Uu RRC message may alternatively be a SidelinkUEInformationNR message.

Optionally, the third message may further carry second indication information. The indication information indicates that the multicast corresponding to the sidelink multicast identifier is used by the remote device to transmit the uplink data.

When the gNB receives a message that carries the sidelink multicast identifier and that is sent by the relay device, the gNB may separately send the RRC reconfiguration message to each relay device. To be specific, the gNB sends the first RRC reconfiguration message (namely, a configuration message) to the relay UE #2, and the gNB sends the second RRC reconfiguration message (namely, a configuration message) to the relay UE #3. The first RRC reconfiguration message and the second RRC reconfiguration message carry a side-link bearer configuration and a Uu bearer identifier (namely, a second Uu bearer identifier). The second Uu bearer iden-tifier identifies a second DRB between the relay device and the gNB. The sidelink bearer configuration includes sidelink bearer indication information. The sidelink bearer indication information indicates a sidelink multicast bearer. There is a mapping relationship between the sidelink multicast bearer and the second DRB. The gNB needs to provide a bearer configuration for each relay device. Because the remote UE #1 uses a Uu link of the relay device for communication during data transmission, the relay device may first receive, from a sidelink bearer between the remote device UE #1 and the relay device, the uplink data sent by the remote UE #1, and the data needs to be mapped to the second DRB of the relay device for data forwarding. Therefore, each relay device needs to know a specific DRB and a specific sidelink bearer, where data from the specific sidelink bearer needs to be forwarded by using the specific DRB of the relay device.

It should be understood that, an execution sequence of steps S804 and S805 is not limited, an execution sequence of S806 and S809 is not limited, and an execution sequence of step S802 and step S803 is not limited. In other words, when there are a plurality of relay devices, no limitation is imposed on sending, by the remote device, the sidelink multicast identifier to each relay device. Similarly, no limi-tation is imposed on sending, by each relay device, the sidelink multicast identifier to the radio access network device.

In this embodiment, the remote UE #1 receives an indi-cation from the gNB to allocate the sidelink multicast identifier, and separately sends the sidelink multicast iden-tifier to each relay UE. Therefore, when the remote UE sends the uplink data by using the sidelink multicast identifier, the relay UE may receive, based on the first received sidelink multicast identifier, the data in the multicast corresponding to the sidelink multicast identifier, and forward the data to the gNB, to improve uplink data transmission efficiency.

Figures 9, 10:
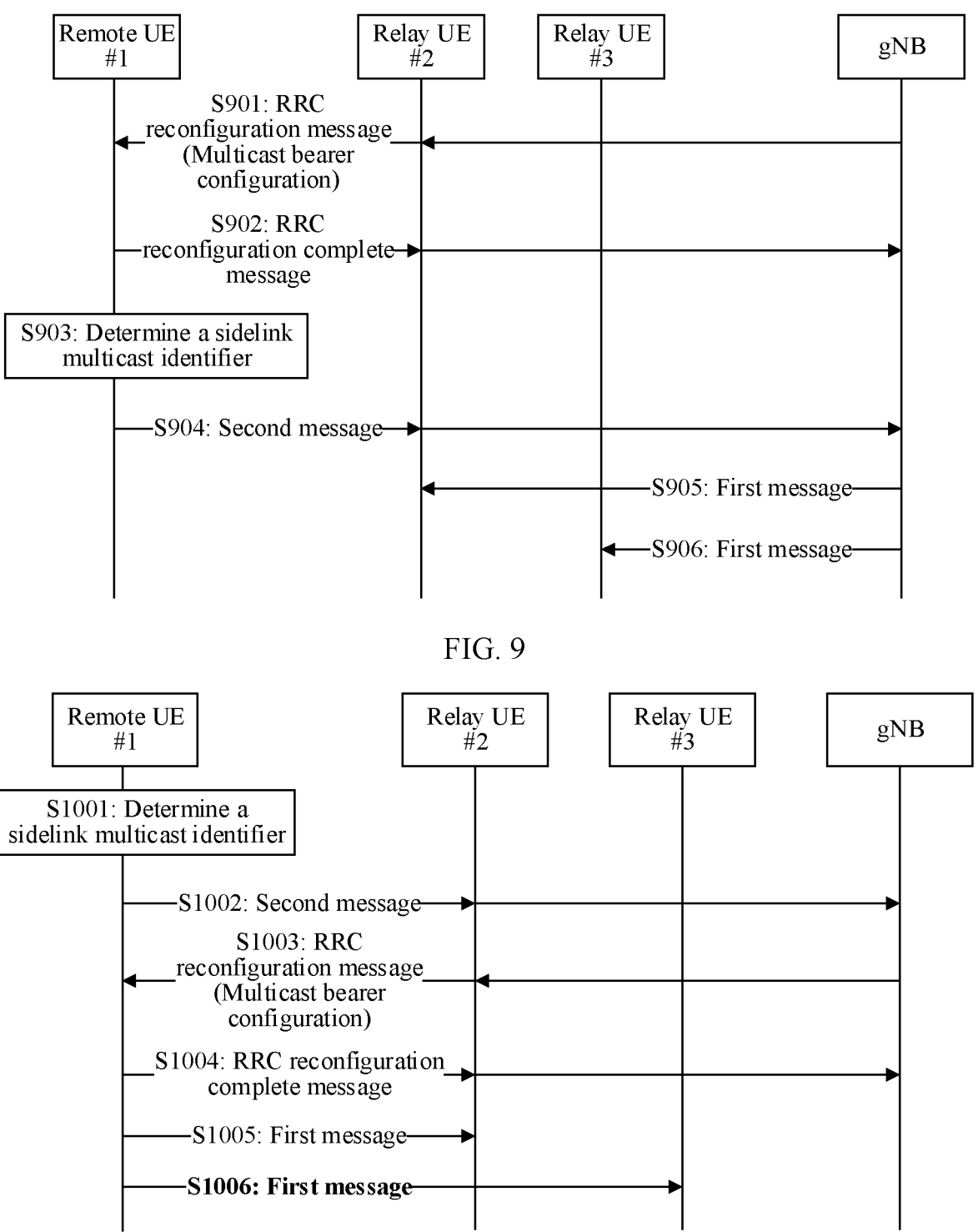
FIG. 9 is another schematic flowchart of a data transmission method according to an embodiment.
FIG. 10 is another schematic flowchart of a data transmission method according to an embodiment.

FIG. 9 is a schematic flowchart of another data transmis-sion method according to an embodiment of this application. As shown in FIG. 9, the method includes a remote UE #1, a relay UE #2, a relay UE #3, and a base station gNB. It should be understood that, in FIG. 9, the remote UE #1 is a remote device, there are two relay devices: the relay UE #2 and the relay UE #3, and a radio access network device is the gNB.

It should be understood that an application scenario of the method may be FIG. 2. To be specific, in FIG. 2, the radio access network device 210 is the gNB, the remote device 240 is the remote UE #1, the relay device 220 is the relay UE #2, and the relay device 230 is the relay UE #3. The specific method in FIG. 9 includes the following steps.

S901: The remote UE #1 receives an RRC reconfiguration message sent by the gNB.

S902: The remote UE #1 sends an RRC reconfiguration complete message to the gNB.

S903: The remote UE #1 determines a sidelink multicast identifier.

For example, for specific implementations of step S901 to step S903, refer to step S701 to step S703. Details are not described herein again.

S904: The remote UE #1 sends a second message to the gNB.

S905: The gNB sends a first message to the relay UE #2.

S906: The gNB sends the first message to the relay UE #2.

For example, the remote UE #1 sends the second message to the gNB. The second message carries the sidelink multicast identifier. Multicast corresponding to the sidelink multicast identifier is used by the remote UE #1 to transmit uplink data.

Optionally, the second RRC message may further carry indication information. The indication information indicates that the sidelink multicast is used by the remote UE #1 to transmit the uplink data to the relay UE #2 and the relay UE #3.

It should be understood that, in this embodiment, the second message is first sent by the remote UE #1 to the relay UE #2, and the relay UE #2 forwards the message to the gNB.

Optionally, the second message may alternatively be first sent by the remote UE #1 to the relay UE #3, and the relay UE #3 forwards the message to the gNB. This is not limited herein.

Optionally, the second message may be a Uu RRC mes-sage, to be specific, an RRC message between the remote UE #1 and the gNB. The Uu RRC message may alternatively be a SidelinkUEInformationNR message.

After receiving the sidelink multicast identifier, the gNB may separately send the first message to the relay UE #2 and the relay UE #3. The first message carries the sidelink multicast identifier. The multicast corresponding to the side-link multicast identifier is used by the remote UE #1 to transmit the uplink data. In other words, in this case, the relay UE #2 and the relay UE #3 obtain the sidelink multicast identifier from the gNB.

Optionally, the first message further includes sidelink multicast bearer indication information and a first Uu bearer identifier. There is a correspondence between the first Uu bearer identifier and the sidelink multicast bearer indication information. The first Uu bearer identifier identifies a first DRB between the remote UE #1 and the gNB. To be specific, after receiving a Uu PDCP PDU by using a sidelink bearer, the relay UE #2 or the relay UE #3 can forward the Uu PDCP PDU to a Uu interface, and transmit the uplink data to the gNB by using a second DRB between the relay UE and the gNB. To be specific, the data is forwarded to a PDCP entity of the gNB by using the second DRB of the relay UE #2 or the relay UE #3.

Optionally, the mapping relationship may alternatively be implemented by an adaptation layer, for example, a BAP layer.

Optionally, the sidelink multicast bearer indication infor-mation may be a logical channel identifier, for example, an LCID, may be PC5 bearer indication information, or may be a sidelink configuration bearer index.

Optionally, the first message may be a Uu RRC message, to be specific, an RRC message sent by the gNB to the relay UE. The Uu RRC message may alternatively be an RRC reconfiguration message.

It should be understood that, after receiving the first message sent by the gNB, the relay UE may send a response message to the gNB. The response message may be an RRC reconfiguration complete message.

In this embodiment, the remote UE #1 receives an indi-cation from the gNB to allocate the sidelink multicast identifier, and sends the sidelink multicast identifier to the gNB. The gNB sends the sidelink multicast identifier to each relay UE. Therefore, when the remote UE sends the uplink data by using the sidelink multicast identifier, the relay UE may receive, based on the first received sidelink multicast identifier, the data in the multicast corresponding to the sidelink multicast identifier, and forward the data to the gNB, to improve uplink data transmission efficiency.

FIG. 10 is a schematic flowchart of another data transmission method according to an embodiment of this application. As shown in FIG. 10, the method 1000 includes a remote UE #1, a relay UE #2, a relay UE #3, and a base station gNB. It should be understood that, in FIG. 10, the remote UE #1 is a remote device, there are two relay devices: the relay UE #2 and the relay UE #3, and a radio access network device is the gNB.

It should be understood that an application scenario of the method may be FIG. 2. To be specific, in FIG. 2, the radio access network device 210 is the gNB, the remote device 240 is the remote UE #2, the relay device 220 is the relay UE #2, and the relay device 230 is the relay UE #3. The specific method in FIG. 10 includes the following steps.

S1001: The remote UE #1 determines a sidelink multicast identifier.

For example, when the remote UE #1 cannot meet a current service requirement in a unicast communication transmission manner, the remote UE #1 may initiate multicast, or the remote UE #1 receives indication information from the gNB, where the indication information indicates the remote UE #1 to allocate the sidelink multicast identifier. In this case, an AS of the remote UE #1 creates sidelink multicast, and an upper layer of the AS allocates the sidelink multicast identifier to the multicast communication. To be specific, the AS of the remote UE #1 may send indication information to the upper layer. The indication information indicates the upper layer to allocate the sidelink multicast identifier. After allocating the sidelink multicast identifier, the upper layer may also send the sidelink multicast identifier to the AS of the remote UE #1. In other words, allocation of the sidelink multicast identifier by the remote UE #1 may be initiated by the remote UE #1, or may be triggered by the indication of the base station.

It should be understood that the foregoing upper layer may be a V2X layer or a PC5-S layer.

Optionally, the sidelink multicast identifier may be an L2 identifier.

S1002: The remote UE #1 sends a second message to the gNB.

S1003: The remote UE #1 receives an RRC reconfiguration message sent by the gNB.

S1004: The remote UE #1 sends an RRC reconfiguration complete message to the gNB.

For example, after the remote UE #1 allocates the sidelink multicast identifier, the remote UE #1 may send the second message to the gNB. The second message carries the sidelink multicast identifier. The multicast corresponding to the sidelink multicast identifier is used by the remote UE #1 to transmit uplink data.

Optionally, the second message may further carry indication information. The indication information indicates that the multicast is used by the remote UE #1 to transmit the uplink data to the relay UE #2 and the relay UE #3.

It should be understood that, in this embodiment, the second message is first sent by the remote UE #1 to the relay UE #2, and the relay UE #2 forwards the message to the gNB.

Optionally, the second message may alternatively be first sent by the remote UE #1 to the relay UE #3, and the relay UE #3 forwards the message to the gNB. This is not limited herein.

Optionally, the second message may be a Uu RRC message, to be specific, an RRC message between the remote UE #1 and the gNB. The Uu RRC message may alternatively be a SidelinkUEInformationNR message.

After the gNB receives the sidelink multicast identifier, the gNB may allocate a sidelink bearer configuration to the remote UE #1. In this case, the gNB sends the RRC reconfiguration message (namely, a configuration message) to the remote UE #1. The RRC reconfiguration message carries the sidelink bearer configuration. The sidelink bearer configuration is for configuring a sidelink multicast bearer between the remote UE #1 and each of the relay UE #1 and the relay UE #2. The sidelink bearer configuration includes sidelink bearer indication information. The sidelink bearer indication information indicates the sidelink multicast bearer. In addition, the sidelink bearer configuration may further include an SL-RLC entity configuration, a logical channel configuration, and the like.

After receiving the sidelink bearer configuration sent by the gNB, the remote UE #1 may send the RRC reconfiguration complete message to the gNB. The message notifies the gNB that the remote UE #1 has received the sidelink bearer configuration.

It should be understood that a specific implementation of how to forward the RRC reconfiguration message and the RRC reconfiguration complete message is consistent with S701 and S702 in FIG. 7. Details are not described herein.

S1005: The remote UE #1 sends a first message to the relay UE #2.

S1006: The remote UE #1 sends the first message to the relay UE #3.

For example, for specific implementations of step S1005 and step S1006, refer to step S704 and step S705. Details are not described herein again.

In this embodiment, the remote UE #1 allocates the sidelink multicast identifier, and separately sends the sidelink multicast identifier to each relay UE. Therefore, when the remote UE sends the uplink data by using the sidelink multicast identifier, the relay UE may receive, based on the first received sidelink multicast identifier, the data in the multicast corresponding to the sidelink multicast identifier, and forward the data to the base station, to improve uplink data transmission efficiency.

Figure 11:
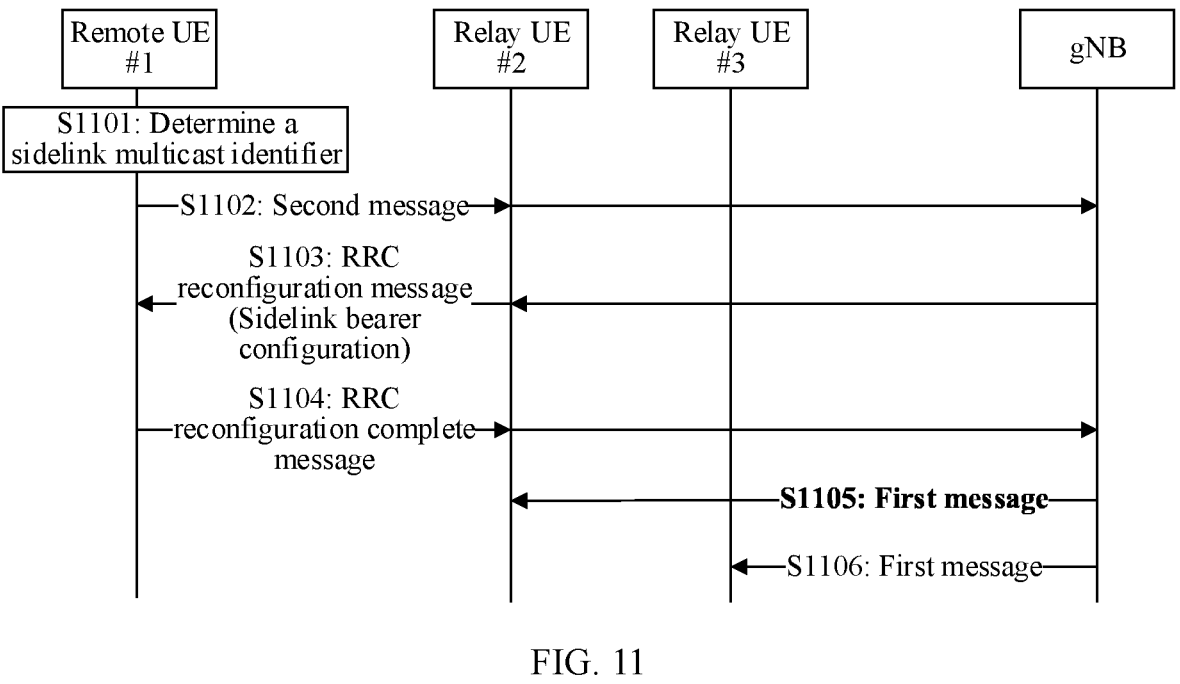
FIG. 11 is another schematic flowchart of a data transmission method according to an embodiment.

FIG. 11 is a schematic flowchart of another data transmission method according to an embodiment of this application. As shown in FIG. 11, the method includes a remote UE #1, a relay UE #2, a relay UE #3, and a base station gNB. It should be understood that, in FIG. 11, the remote UE #1 is a remote device, there are two relay devices: the relay UE #2 and the relay UE #3, and a radio access network device is the gNB.

It should be understood that an application scenario of the method may be FIG. 2. To be specific, in FIG. 2, the radio access network device 210 is the gNB, the remote device 240 is the remote UE #2, the relay device 220 is the relay UE #2, and the relay device 230 is the relay UE #3. The specific method in FIG. 11 includes the following steps.

S1101: The remote UE #1 determines a sidelink multicast identifier.

S1102: The remote UE #1 sends a second message to the gNB.

S1103: The remote UE #1 receives an RRC reconfiguration message sent by the gNB.

S1104: The remote UE #1 sends an RRC reconfiguration complete message to the gNB.

For example, for specific implementations of step S1101 to step S1104, refer to step S1001 to step S1004. Details are not described herein again.

S1105: The gNB sends a first message to the relay UE #2.

S1106: The gNB sends the first message to the relay UE #2.

For example, for specific implementations of step S1105 and step S1106, refer to step S905 and step S906. Details are not described herein again.

It should be understood that, in any method in FIG. 7 to FIG. 11, when configurations of both a unicast communication apparatus and a multicast communication apparatus are reserved between the remote UE and the relay UE, the remote UE may flexibly switch between multicast and unicast.

For example, a DRB between the remote UE and the base station corresponds to two sidelink bearers. To be specific, one first DRB corresponds to both a sidelink multicast bearer and a sidelink unicast bearer. In this case, the remote UE may perform switching independently or based on an indication of the base station.

Optionally, the indication information may be an RRC message, or may be a Uu MAC CE sent by the base station to the relay UE, and the relay UE generates a PC5 MAC CE and forwards the PC5 MAC CE to the remote UE, so that the remote UE flexibly switches between multicast communication and unicast communication based on the indication information.

Therefore, according to the foregoing five transmission methods, the remote UE can simultaneously send uplink data to a plurality of relay UEs in a sidelink multicast manner, to improve efficiency of sending the uplink data by the remote UE to the radio access network device.

It should be understood that the foregoing five transmission methods are merely examples rather than limitations. Determining, by the remote device, the sidelink multicast identifier, directly or indirectly sending the sidelink multicast identifier to the relay device, and directly or indirectly sending the sidelink multicast identifier to the radio access network device, all fall within the protection scope of embodiments of this application. Details are not described herein.

Figure 12:
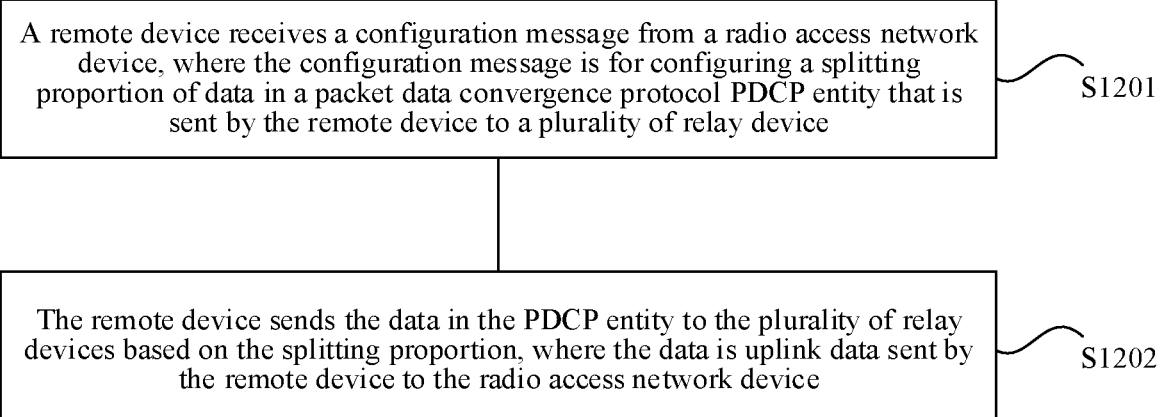
FIG. 12 is another schematic flowchart of a data transmission method according to an embodiment.

When the remote device performs uplink data transmission by using unicast communication, or in a scenario shown in FIG. 3, or when there is no direct connection link between the remote device and the radio access network device, the remote device may obtain a resource in a mode 2. Similarly, as shown in FIG. 12, the method includes a remote UE #1, a relay UE #2, a relay UE #3, and a radio access network device gNB. It should be understood that, in FIG. 12, the remote UE #1 is a remote device, there are two relay devices: the relay UE #2 and the relay UE #3, and the radio access network device is the gNB. The specific method in FIG. 12 includes the following steps:

S1201: The remote device receives a configuration message from the radio access network device, where the configuration message is for configuring a splitting proportion of data that is in a packet data convergence protocol PDCP entity and that is sent by the remote device to a plurality of relay devices; and S1202: The remote device sends the data in the PDCP entity to the plurality of relay devices based on the splitting proportion, where the data is uplink data sent by the remote device to the radio access network device.

For example, when the remote device transmits the uplink data to the radio access network device in a unicast connection manner, to improve data transmission efficiency, the remote device needs to know how much data is sent to each relay device. Therefore, the remote device needs to determine the splitting proportion of the data volume of the PDCP entity. Usually, the radio access network device may send the configuration message to the remote device. The configuration message is for configuring the splitting proportion of the data that is in the PDCP entity and that is sent by the remote device to the plurality of relay devices.

Optionally, the configuration message may further include first indication information. The first indication information indicates at least two links between the remote device and the plurality of relay devices. In this case, the configuration information may be a splitting proportion of data that is in the PDCP entity and that is sent by the remote device to each of the at least two links.

For example, the first indication information may be an identifier of each relay device, or more specifically, the indication information may be an identifier of a connection link between each relay device and the remote device, for example, an L2 identifier.

For example, there are two relay devices between the remote UE #1 and the gNB, to be specific, the remote UE #1 is connected to the gNB separately through the relay UE #2 and the relay UE #3. The remote UE #1 receives an RRC configuration message sent by the gNB. The RRC configuration message carries an identifier L2 ID1 of a connection link between the remote UE #1 and the relay UE #2 and an identifier L2 ID2 of a connection link between the remote UE #1 and the relay UE #3, and an allocated data proportion corresponding to the relay UE #2 is 40%, and an allocated data proportion corresponding to the relay UE #3 is 60%. The remote UE #1 may allocate to-be-transmitted data to each relay UE based on the configuration message. For example, a volume of data in PDCP to be transmitted by the remote UE #1 is 100 M, and based on the corresponding proportion, 40 M may be allocated to a link whose identifier is L2 ID1 and 60 M may be allocated to a link whose identifier is L2 ID2. Therefore, when the data in the PDCP entity is transmitted, 40 M data may be transmitted to the link whose identifier is L2 ID1 and 60 M data may be transmitted to the link whose identifier is L2 ID2.

Optionally, the configuration message may further include second indication information. The second indication information indicates that one of the plurality of relay devices is a primary device and another device is a secondary device. In this case, the configuration information may be a splitting proportion of data that is in a PDCP entity and that is sent to the primary device and the secondary device.

Optionally, when there are only two indirect links between the remote device and the radio access network device, the second indication information carried in the configuration information sent by the radio access network device to the remote device indicates that one of the two relay devices is the primary device, and indicates a splitting proportion corresponding to the primary device.

For example, the remote UE #1 is connected to the gNB separately through the UE #2 and the UE #3. The remote UE #1 receives the RRC configuration message sent by the gNB. The RRC configuration message carries the second indication information. The second indication information indicates that the remote relay UE #2 is the primary device, and an allocated data proportion corresponding to the relay UE #2 is 70%. In other words, after receiving the configuration information, the remote UE #1 may allocate 70% of data to the relay UE #2, and allocate remaining data to the relay UE #3. For example, a volume of data in PDCP to be transmitted by the remote UE #1 is 100 M. The remote UE #1 may allocate 70 M to the relay UE #2, and allocate remaining 30 M to the relay UE #3.

It should be understood that when there are more than two indirect links between the remote device and the radio access network device, the radio access network device may alternatively indicate that a specific relay device is a primary device and specific relay devices are secondary devices. However, in this case, splitting proportions corresponding to the primary device and each of the secondary devices need to be clearly indicated.

Optionally, the splitting proportion mentioned above may be at a bearer granularity. In other words, each bearer configuration corresponds to a different proportion.

For example, one DRB corresponds to two sidelink bearers: a sidelink bearer 1 and a sidelink bearer 2. A splitting proportion corresponding to the sidelink bearer 1 is 40%, and a splitting proportion corresponding to the sidelink bearer 2 is 60%. In other words, if there is 100 M data in one DRB, 40 M of the data is transmitted by using the sidelink bearer 1, and 60 M of the data is transmitted by using the sidelink bearer 2.

Optionally, the splitting proportion mentioned above may be at a UE granularity. In other words, the splitting proportion is applicable to all DRBs of the remote device. It should be noted that the PDCP entity is a PDCP entity of the DRB of the remote device.

For example, the remote UE #1 is connected to the gNB separately through the relay UE #2 and the relay UE #3. In this case, the remote UE #1 has a plurality of DRBs. It should be understood that one DRB corresponds to one PDCP. In other words, if there are three DRBs, the remote UE has three PDCPs corresponding to the DRBs. For example, a splitting proportion configured between the remote UE #1 and the relay UE #2 is 40%, and data in a PDCP 1 entity is 100 M. In this case, the remote UE #1 may allocate 40 M to a connection link between the remote UE #1 and the relay UE #2, and allocate 60 M to a connection link between the remote UE #1 and the relay UE #3. If there is 50 M data in a PDCP 2, the remote UE #1 may allocate 20 M to the connection link between the remote UE #1 and the relay UE #2, and allocate 30 M to the connection link between the remote UE #1 and the relay UE #3. If a PDCP 3 has 200 M, the remote UE #1 may allocate 80 M to the connection link between the remote UE #1 and the relay UE #2, and allocate 120 M to the connection link between the remote UE #1 and the relay UE #3.

It should be understood that when time for receiving data transmitted on one of the links is excessively long, the radio access network device may send the configuration message to the remote device again. The configuration message is a splitting proportion of data that is in a PDCP entity and that is sent by the remote device to each sidelink of the at least two links, to adjust the allocation proportion. Optionally, the configuration message may be an RRC reconfiguration message.

For example, when the remote UE #1 is connected to the gNB separately through the relay UE #2, the relay UE #3, and a relay UE #4, in a configuration message sent for the first time, a proportion that the remote UE #1 should allocate to the relay UE #2 is 30%, a proportion that the remote UE #1 should allocate to the relay UE #3 is 30%, and a proportion that the remote UE #1 should allocate to the relay UE #4 is 40%. For example, if there is 100 M data in a PDCP of the remote UE #1, 30 M data is transmitted to the relay UE #2, 30 M data is transmitted to the relay UE #3, and 30 M data is transmitted to the relay UE #4. Based on various measurement results reported by the remote UE #1 to the gNB, time in which the gNB receives data transmitted on each link may be roughly obtained. However, when the gNB receives data from the relay UE #2 and the relay UE #4, the gNB does not receive data from the relay UE #3 for long time or receives data from the relay UE #3 after long time. In this case, the gNB may send an RRC reconfiguration message to the remote UE #1. The reconfiguration message is an adjusted splitting proportion. For example, an allocated data proportion corresponding to the relay UE #2 is 35%, an allocated data proportion corresponding to the relay UE #3 is 20%, and an allocated data proportion corresponding to the relay UE #4 is 45%. In other words, when a status of a link between the relay device and the remote device does not match a status of a link between the relay device and the radio access network device, the radio access network device may send a reconfiguration message to the remote device, to re-adjust a splitting proportion for each link until data transmission efficiency of the link is optimal.

In this embodiment, the radio access network device provides the splitting proportion of the data volume of the PDCP entity for the remote device, so that uplink transmission of the remote device can adapt to an uplink status between the relay device and the remote device, to improve data transmission efficiency.

Figure 13:
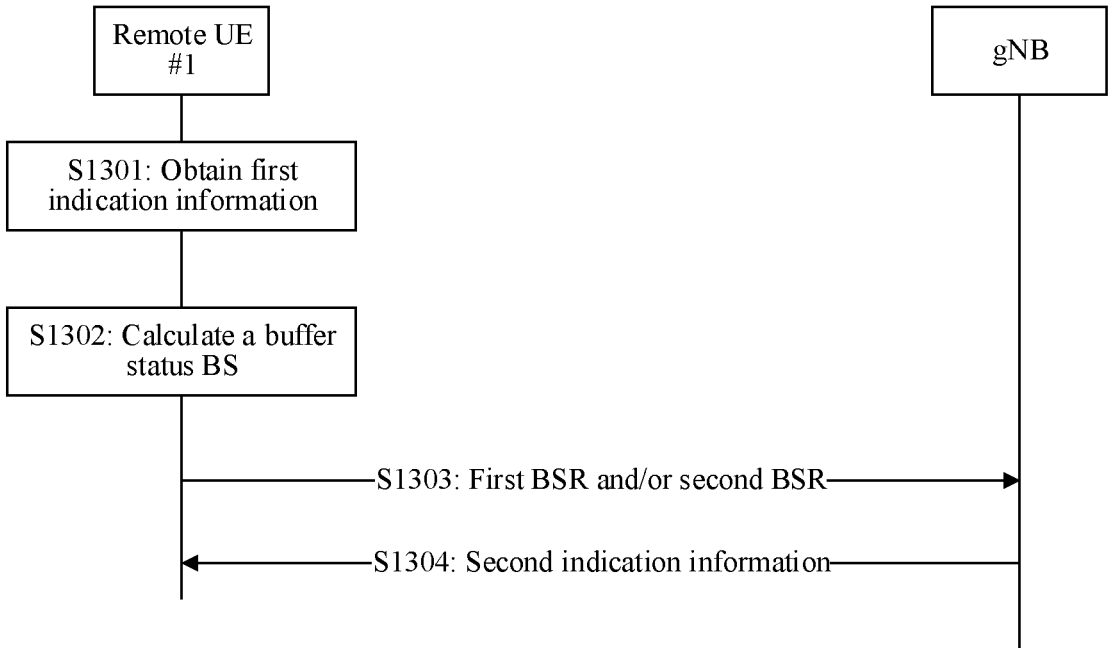
FIG. 13 is another schematic flowchart of a data transmission method according to an embodiment.

FIG. 13 is a schematic flowchart of another uplink transmission method according to an embodiment of this application. As shown in FIG. 13, the method includes a remote UE #1, a relay UE #2, and a base station gNB. It should be understood that, in FIG. 13, the remote UE #1 is a remote device, a relay device is the relay UE #2, and a radio access network device is the gNB.

It should be understood that an application scenario of the method may be FIG. 1. To be specific, in the figure, the radio access network device 110 is the gNB, the remote device 120 is the remote UE #1, and the relay device 130 is the relay UE #2. The specific method in FIG. 13 includes the following steps:

S1301: The remote UE #1 obtains first indication information;

S1302: The remote UE #1 calculates a buffer status BS;

S1303: The remote UE #1 sends a first BSR and/or a second BSR to the gNB; and S1304: The remote UE #1 receives third indication information sent by the gNB.

For example, when both a direct link and an indirect link exist between the remote device and the radio access network device, and the remote device needs to transmit uplink data to the radio access network device, the remote device may first send a buffer status report to the radio access network device to request uplink resource scheduling. However, to avoid over-scheduling caused by repeated sending of data in a PDCP entity of the remote device, this embodiment of this application proposes that the buffer status BS is calculated based on a splitting proportion indicated by indication information before a request message is sent. Then, the message for requesting uplink resource scheduling is sent.

For example, that the remote UE #1 obtains the first indication information includes receiving indication information from the radio access network device or that the remote UE #1 obtains indication information locally pre-configured in the remote device. In other words, the splitting proportion of the data volume of the PDCP entity of the remote UE #1 may be indicated by the radio access network device, or may be specified in a protocol. The first indication information indicates the splitting proportion of the data volume of the PDCP entity. The splitting proportion includes a data proportion of a data volume that is of the PDCP entity and that is allocated to a first link and/or a data proportion of a data volume that is of the PDCP entity and that is allocated to a second link.

It should be understood that the first link is used by the remote UE #1 to transmit Uu uplink data to the gNB, and the second link is used by the remote UE #1 to transmit sidelink uplink data to the gNB through the relay UE #2 (not shown in the figure).

After receiving the first indication information, the remote UE #1 may calculate the BS based on the splitting proportion indicated by the first indication information. The BS includes a BS in the first BSR and/or a BS in the second BSR. The first BSR is for requesting Uu uplink resource scheduling, and the second BSR is for requesting sidelink resource scheduling. Then, the remote UE #1 may send the first BSR and/or the second BSR to the gNB based on the BS calculated by the remote UE #1.

Optionally, a local preconfiguration of the remote device may be that a protocol specifies that all data volumes of the PDCP entity are calculated into the BS in the first BSR for requesting a Uu uplink resource, or all data volumes of the PDCP entity are calculated into the BS in the second BSR for requesting a sidelink resource. When all data volumes of the PDCP entity are calculated into the BS in the first BSR for requesting a Uu uplink resource, the remote UE #1 may send the first BSR to the radio access network device. When all data volumes of the PDCP entity are calculated into the BS in the second BSR for requesting a sidelink resource, the remote UE #1 may send the second BSR to the radio access network device.

Optionally, calculating the BS based on the first indication information sent by the radio access network device may be: The first indication information indicates that all data volumes of the PDCP entity are calculated into the BS in the first BSR for requesting a Uu uplink resource, or all data volumes of the PDCP entity are calculated into the BS in the second BSR for requesting a sidelink resource, or the first indication information indicates a proportion of a data volume that is of the PDCP entity and that is allocated to the BS in the first BSR and a proportion of a data volume that is of the PDCP entity and that is allocated to the BS in each second BSR. In this case, it should be understood that a splitting proportion range should be greater than 0 and less than 1.

When the first indication information indicates that all data volumes of the PDCP entity are calculated into the BS in the first BSR for requesting a Uu uplink resource, the remote UE #1 may send the first BSR to the radio access network device; when the first indication information indicates that all data volumes of the PDCP entity are calculated into the BS in the second BSR for requesting a sidelink resource, the remote UE #1 may send the second BSR to the radio access network device; or when the first indication information indicates that the data volume of the PDCP entity is proportionally allocated to the BS in the first BSR and the BS in each second BSR, the remote UE #1 may send the first BSR and the second BSR to the radio access network device.

When there are one direct link and one indirect link between the radio access network device and the remote device, both the foregoing two manners may be used. When there are one direct link and a plurality of indirect links between the radio access network device and the remote device, the data volume of the PDCP entity may be proportionally allocated based on the first indication information sent by the radio access network device, to be specific, the data volume of the PDCP entity is proportionally allocated to the BS in the first BSR and the BS in each second BSR.

Optionally, after receiving the first BSR and/or the second BSR, the radio access network device may send second indication information to the remote device. The second indication information indicates the remote device to schedule a Uu uplink resource and a sidelink resource.

Optionally, the indication information may be downlink control information (DCI).

For example, after receiving the first BSR, the radio access network device may send, to the remote device, DCI for scheduling the Uu uplink resource and the sidelink resource. In other words, one piece of DCI includes indication information for scheduling both the Uu uplink resource and the sidelink resource. After receiving the indication information, the remote device may send the Uu uplink resource and the sidelink resource to the radio access network device. After receiving the second BSR, the radio access network device may also send, to the remote device, the DCI for scheduling the Uu uplink resource and the sidelink resource, and after receiving the indication information, the remote device may send the Uu uplink resource and the sidelink resource to the radio access network device. After receiving the first BSR and the second BSR, the radio access network device may also send, to the terminal device, the DCI for scheduling the Uu uplink resource and the sidelink resource, and after receiving the indication information, the remote device may send the Uu uplink resource and the sidelink resource to the radio access network device. In other words, the radio access network device may schedule the Uu uplink resource and the sidelink resource for the remote device in one piece of DCI.

Optionally, the splitting proportion mentioned above may be at a bearer granularity. In other words, each bearer configuration corresponds to a different proportion. To be specific, proportions of data volumes of PDCP entities allocated to the first link and the second link are different.

Optionally, the splitting proportion mentioned above may be at a UE granularity. In other words, the splitting proportion is applicable to all DRBs of the remote device. It should be noted that the PDCP entity is a PDCP entity of the DRB of the remote device.

In this embodiment, the remote device determines a BS calculation manner based on the local preconfiguration or the indication information of the radio access network, and requests, based on the BS calculation manner, the radio access network device to schedule an uplink resource, to avoid over-scheduling. In addition, the radio access network schedules both the Uu uplink resource and the sidelink resource by using the indication information, to improve scheduling efficiency.

In embodiments, unless otherwise specified, words such as "first" and "second" are merely used to distinguish between different individuals. For example, the "first indication information" and the "second indication information" are two pieces of different or mutually independent indication information. There is no other limitation except this.

The following describes in detail a communication apparatus provided in embodiments of this application with reference to FIG. 14 to FIG. 21.

Figure 14:
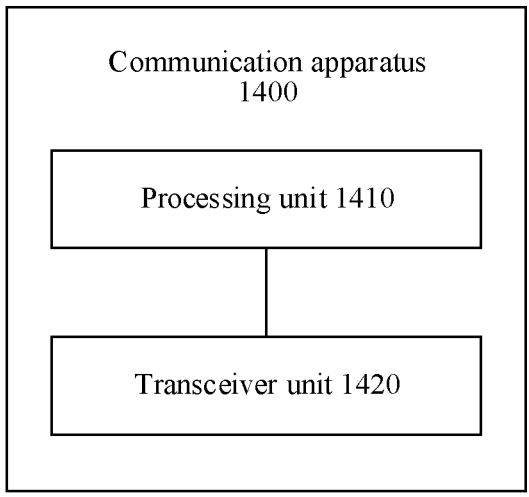
FIG. 14 is a schematic block diagram of a communication apparatus according to an embodiment.

FIG. 14 is a schematic block diagram of a communication apparatus according to an embodiment of this disclosure. As shown in FIG. 14, the communication apparatus 1400 may include a processing unit 1410 and a transceiver unit 1420.

In a possible design, the communication apparatus 1400 may correspond to the remote device in the foregoing method embodiment.

The communication apparatus 1400 may correspond to the remote devices in FIG. 6, FIG. 7, FIG. 8, FIG. 9, FIG. 10, and FIG. 11 according to embodiments of this application. The units in the communication apparatus 1400 and the foregoing other operations and/or functions are respectively to implement corresponding procedures in FIG. 6, FIG. 7, FIG. 8, FIG. 9, FIG. 10, and FIG. 11.

For example, the processing unit 1410 is configured to determine a sidelink multicast identifier. The sidelink multicast identifier identifies multicast between the remote device and a plurality of relay devices. The transceiver unit 1420 is configured to send uplink data to the plurality of relay devices in a multicast manner based on the sidelink multicast identifier. The uplink data is data sent by the remote device to a radio access network device.

Optionally, the transceiver unit 1420 is further configured to send a first message to the plurality of relay devices. The first message includes the sidelink multicast identifier.

Optionally, the first message further includes sidelink bearer indication information and a first Uu bearer identifier. The first Uu bearer identifier identifies a first data radio bearer DRB between the remote device and the radio access network device. The sidelink bearer indication information indicates a sidelink multicast bearer. There is a correspondence between the sidelink multi cast bearer and the first DRB.

Optionally, the transceiver unit 1420 is further configured to receive a configuration message from the radio access network device. The configuration message includes a sidelink bearer configuration. The sidelink bearer configuration is for configuring a sidelink multicast bearer between the remote device and the plurality of relay devices. That the remote device determines the sidelink multicast identifier includes performing the determining based on the configuration message.

Optionally, the transceiver unit 1420 is further configured to send a second message to the radio access network device. The second message includes the sidelink multicast identifier.

Optionally, the transceiver unit 1420 is further configured to send the second message to the radio access network device. The second message includes the sidelink multicast identifier. The transceiver unit 1420 is further configured to receive the configuration message from the radio access network device. The configuration message includes the sidelink bearer configuration. The sidelink bearer configuration is for configuring the sidelink multicast bearer between the remote device and the plurality of relay devices. The sidelink multicast bearer is for transmitting the uplink data in the multicast corresponding to the sidelink multicast identifier.

Optionally, the transceiver unit 1420 is further configured to receive first indication information from the radio access network device. The first indication information indicates the remote device to determine the sidelink multicast identifier.

Optionally, the second message further includes second indication information. The second indication information indicates that the multicast corresponding to the sidelink multicast identifier is used by the remote device to transmit the uplink data.

Optionally, the sidelink bearer configuration includes the sidelink bearer indication information. The sidelink bearer indication information indicates the sidelink multicast bearer. The configuration message further includes the first Uu bearer identifier. The first Uu bearer identifier identifies the first DRB between the remote device and the radio access network device. The sidelink bearer indication information indicates the sidelink multicast bearer. There is a correspondence between the sidelink multicast bearer and the first DRB.

Optionally, the processing unit 1410 is further configured to enable the first DRB to correspond to the sidelink multicast bearer and a sidelink unicast bearer.

Optionally, the transceiver unit 1420 is further configured to receive third indication information from the radio access network device. The third indication information indicates that a transmission manner between the remote device and the plurality of relay devices is switched from multicast communication to unicast communication or from unicast communication to multicast communication.

Figure 15:
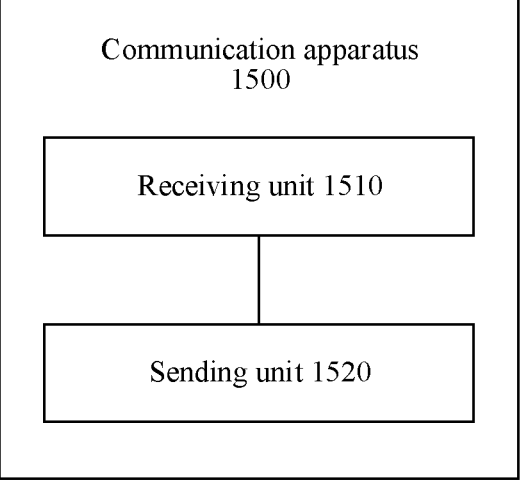
FIG. 15 is another schematic block diagram of a communication apparatus according to an embodiment.

FIG. 15 is a schematic block diagram of a communication apparatus according to an embodiment of this application. As shown in the figure, the communication apparatus 1500 may include a receiving unit 1510 and a sending unit 1520.

In a possible design, the communication apparatus 1500 may correspond to the relay device in the foregoing method embodiment.

The communication apparatus 1500 may correspond to the relay devices in FIG. 6, FIG. 7, FIG. 8, FIG. 9, FIG. 10, and FIG. 11 according to embodiments of this application. The units in the communication apparatus 1500 and the foregoing other operations and/or functions are respectively to implement corresponding procedures in FIG. 6, FIG. 7, FIG. 8, FIG. 9, FIG. 10, and FIG. 11.

For example, the receiving unit 1510 is configured to receive a first message. The first message includes a sidelink multicast identifier. The sidelink multicast identifier identifies multicast between a remote device and the relay device. The receiving unit 1510 is further configured to receive uplink data sent by the remote device in a multicast manner based on the sidelink multicast identifier. The uplink data is data sent by the remote device to a radio access network device.

Optionally, the first message further includes sidelink bearer indication information and a first Uu bearer identifier. The first Uu bearer identifier identifies a first data radio bearer DRB between the remote device and the radio access network device. The sidelink bearer indication information indicates a sidelink multicast bearer. There is a correspondence between the sidelink multicast bearer and the first DRB.

Optionally, the receiving unit 1510 is further configured to receive the first message from the remote device, or the receiving unit 1510 is further configured to receive the first message from the radio access network device.

The communication apparatus further includes the sending unit 1520, configured to send a third message to the radio access network device. The third message includes the sidelink multicast identifier. The receiving unit 1510 is further configured to receive a configuration message from the radio access network device. The configuration message includes a sidelink bearer configuration and a second Uu bearer identifier. The sidelink bearer configuration includes the sidelink bearer indication information. The sidelink bearer indication information indicates the sidelink multicast bearer. The second Uu bearer identifier identifies a second data radio bearer DRB between the relay device and the radio access network device. There is a correspondence between the sidelink multicast bearer and the second DRB.

Optionally, the third message further includes second indication information. The second indication information indicates that the multicast corresponding to the sidelink multicast identifier is used by the remote device to transmit the uplink data.

Figure 16:
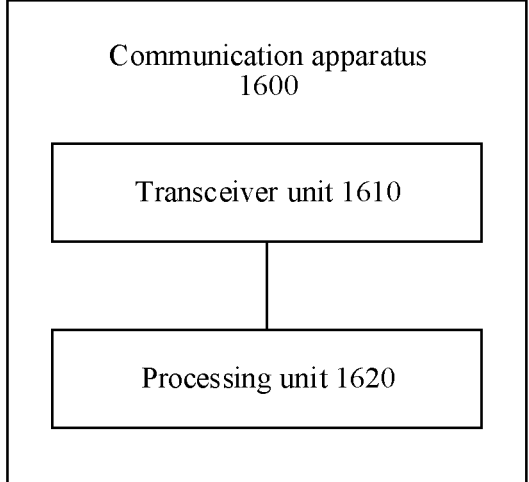
FIG. 16 is another schematic block diagram of a communication apparatus according to an embodiment.

FIG. 16 is a schematic block diagram of a communication apparatus according to an embodiment of this application.

As shown in the figure, the communication apparatus 1600 may include a transceiver unit 1610 and a processing unit 1620.

In a possible design, the communication apparatus 1600 may correspond to the radio access network device in the foregoing method embodiment.

The communication apparatus 1600 may correspond to the radio access network devices in FIG. 6, FIG. 7, FIG. 8, FIG. 9, FIG. 10, and FIG. 11 according to embodiments of this disclosure. The units in the communication apparatus 1600 and the foregoing other operations and/or functions are respectively to implement corresponding procedures in FIG. 6, FIG. 7, FIG. 8, FIG. 9, FIG. 10, and FIG. 11.

The transceiver unit 1610 is configured to send a configuration message to a remote device. The configuration message includes a sidelink bearer configuration. The sidelink bearer configuration is for configuring a sidelink multicast bearer between the remote device and a relay device. The sidelink multicast bearer is for transmitting uplink data in multicast corresponding to a sidelink multicast identifier. The sidelink multicast identifier identifies the multicast between the remote device and the relay device. The transceiver unit 1610 is further configured to receive a response message from the remote device.

Optionally, the sidelink bearer configuration includes a sidelink bearer indication message. The sidelink bearer indication information indicates the sidelink multicast bearer. The configuration message further includes a first Uu bearer identifier. The first Uu bearer identifier identifies a first data radio bearer DRB between the remote device and the radio access network device. The bearer indication information indicates the sidelink multicast bearer. There is a correspondence between the sidelink multicast bearer and the first DRB.

Optionally, the transceiver unit 1610 is further configured to receive a second message from the remote device. The second message includes the sidelink multicast identifier.

Optionally, the transceiver unit 1610 is further configured to receive a second message from the remote device. The second message includes the sidelink multicast identifier. The radio access network device sends the configuration message to the remote device based on the second message.

Optionally, the transceiver unit 1610 is further configured to send first indication information to the remote device. The indication information indicates the remote device to determine the sidelink multicast identifier.

Optionally, the transceiver unit 1610 is further configured to send a first message to the relay device. The first message includes the sidelink multicast identifier.

Optionally, the first message further includes the sidelink bearer indication information and the first Uu bearer identifier. The first Uu bearer identifier identifies the first data radio bearer DRB between the remote device and the radio access network device. The bearer indication information indicates the sidelink multicast bearer. There is a correspondence between the sidelink multicast bearer and the first DRB.

Optionally, the second message further includes second indication information. The second indication information indicates that the multicast corresponding to the sidelink multicast identifier is used by the remote device to transmit the uplink data.

Optionally, the transceiver unit 1610 is further configured to receive a third message from the relay device. The third message includes the sidelink multicast identifier. The transceiver unit 1610 is further configured to send the configuration message to the relay device. The configuration message sage includes the sidelink bearer configuration and a second Uu bearer identifier. The sidelink bearer configuration includes the sidelink bearer indication information. The sidelink bearer indication information indicates the sidelink multicast bearer. The second Uu bearer identifier identifies a second data radio bearer DRB between the relay device and the radio access network device. There is a correspondence between the sidelink multicast bearer and the second DRB.

Optionally, the third message further includes second indication information. The indication information indicates that the multicast corresponding to the sidelink multicast identifier is used by the remote device to transmit the uplink data.

Optionally, the communication apparatus further includes the processing unit 1620, configured to enable the first DRB to correspond to the sidelink multicast bearer and a sidelink unicast bearer.

Optionally, the transceiver unit 1610 is further configured to send third indication information to the remote device. The third indication information indicates that a transmission manner between the remote device and the relay device is switched from multicast communication to unicast communication or from unicast communication to multicast communication.

Figure 17:
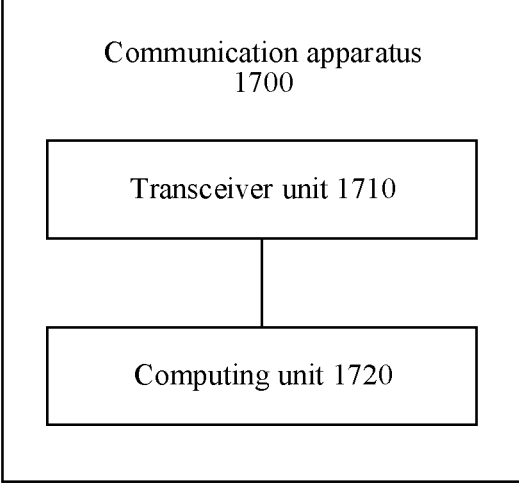
FIG. 17 is another schematic block diagram of a communication apparatus according to an embodiment.

FIG. 17 is a schematic block diagram of a communication apparatus according to an embodiment of this application. As shown in the figure, the communication apparatus 1700 may include a transceiver unit 1710 and a computing unit 1720.

In a possible design, the communication apparatus 1700 may correspond to the remote device in the foregoing method embodiment.

The communication apparatus 1700 may correspond to the remote device in FIG. 13 according to an embodiment of this disclosure. The units in the communication apparatus 1700 and the foregoing other operations and/or functions are respectively to implement corresponding procedures in FIG. 13.

The transceiver unit 1710 is configured to obtain first indication information. The first indication information indicates a splitting proportion of a data volume of a packet data convergence protocol PDCP entity. The computing unit 1720 is configured to calculate a buffer status BS based on the splitting proportion indicated by the first indication information.

Optionally, the splitting proportion includes a data proportion of a data volume that is of the PDCP entity and that is allocated to a first link and/or a data proportion of a data volume that is of the PDCP entity and that is allocated to a second link. The first link is used by the remote device to transmit uplink data to a radio access network device. The second link is used by the remote device to transmit the uplink data to the radio access network device by using a plurality of relay devices. That the computing unit 1720 calculates the BS based on the splitting proportion includes: calculating a BS in a first buffer status report BSR based on the splitting proportion and/or calculating a B S in a second BSR based on the splitting proportion. The first BSR is for requesting to schedule a Uu uplink resource. The second BSR is for requesting to schedule a sidelink resource. The transceiver unit 1710 is further configured to send the first BSR and/or the second BSR to the radio access network device.

Optionally, the transceiver unit 1710 is further configured to receive the first indication information from the radio access network device, or the transceiver unit is further configured to obtain the first indication information locally preconfigured by the remote device.

Optionally, the computing unit 1720 is specifically configured to allocate all data volumes of the PDCP entity to the BS in the first BSR, where the transceiver unit 1710 is configured to send the first BSR to the radio access network device; the computing unit 1720 is specifically configured to allocate all data volumes of the PDCP entity to the BS in the second BSR, where the transceiver unit 1710 is configured to send the second BSR to the radio access network device; or the computing unit 1720 is specifically configured to allocate the data volumes of the PDCP entity to the BS in the first BSR and the BS in the second BSR in a proportion, where a range of the splitting proportion is greater than 0 and less than 1, and the transceiver unit 1710 is configured to send the first BSR and the second BSR to the radio access network device.

Optionally, the splitting proportion is applicable to all data radio bearers DRBs of the remote device, and the PDCP entity is a PDCP entity of the DRB of the remote device.

Optionally, the first indication information further includes a bearer identifier, and the bearer identifier corresponds to the splitting proportion.

Optionally, the transceiver unit 1710 is further configured to receive second indication information from the network device. The second indication information indicates the remote device to schedule the Uu uplink resource and the sidelink resource.

Figure 18:
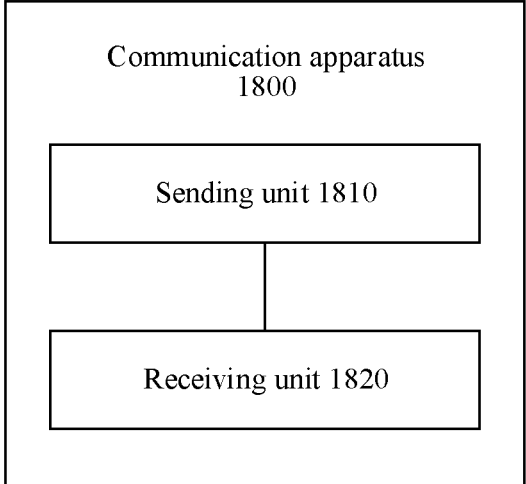
FIG. 18 is another schematic block diagram of a communication apparatus according to an embodiment.

FIG. 18 is a schematic block diagram of a communication apparatus according to an embodiment of this disclosure. As shown in the figure, the communication apparatus 1800 may include a sending unit 1810 and a receiving unit 1820.

In a possible design, the communication apparatus 1800 may correspond to the radio access network device in the foregoing method embodiment.

Specifically, the communication apparatus 1800 may correspond to the radio access network device in FIG. 13 according to an embodiment. The units in the communication apparatus 1800 and the foregoing other operations and/or functions are respectively to implement corresponding procedures in FIG. 13.

The sending unit 1810 is configured to send a first indication message to a remote device. The first indication message indicates a splitting proportion of a data volume of a packet data convergence protocol PDCP entity. The receiving unit 1820 is configured to receive a first buffer status report BSR and/or a second BSR sent by the remote device. The first BSR is for requesting to schedule a Uu uplink resource. The second BSR is for requesting to schedule a sidelink resource.

Optionally, the splitting proportion includes a data proportion of a data volume that is of the PDCP entity and that is allocated to a first link and/or a data proportion of a data volume that is of the PDCP entity and that is allocated to a second link. The first link is used by the radio access network device to receive uplink data transmitted by the remote device. The second link is used by the radio access network device to receive, by using a plurality of relay devices, the uplink data transmitted by the remote device.

Optionally, the splitting proportion is applicable to all data radio bearers DRBs of the remote device, and the PDCP entity is a PDCP entity of the DRB of the remote device.

Optionally, the first indication information further includes a bearer identifier, and the bearer identifier corresponds to the splitting proportion.

Optionally, the sending unit 1810 is further configured to send second indication information to the remote device.

The second indication information indicates the remote device to schedule the Uu uplink resource and the sidelink resource.

Figure 19:
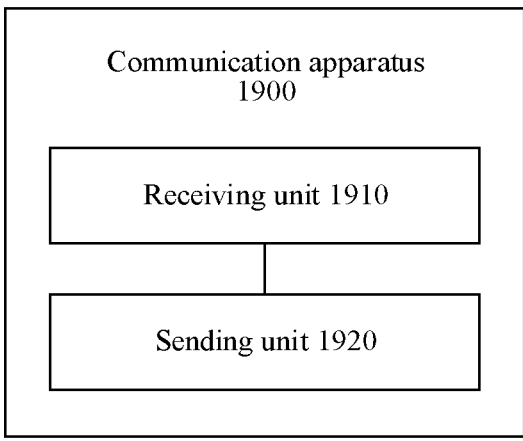
FIG. 19 is another schematic block diagram of a communication apparatus according to an embodiment.

FIG. 19 is a schematic block diagram of a communication apparatus according to an embodiment of this disclosure. As shown in the figure, the communication apparatus 1900 may include a receiving unit 1910 and a sending unit 1920.

In a possible design, the communication apparatus 1900 may correspond to the remote device in the foregoing method embodiment.

Specifically, the communication apparatus 1900 may correspond to the remote device in FIG. 12 according to an embodiment of this application. The units in the communication apparatus 1900 and the foregoing other operations and/or functions are respectively to implement corresponding procedures in FIG. 12.

Specifically, the receiving unit 1910 is configured to receive a configuration message from a radio access network device. The configuration message is for configuring a splitting proportion of data that is in a packet data convergence protocol PDCP entity and that is sent by the remote device to a plurality of relay devices. The sending unit 1920 is configured to send data in the PDCP entity to the plurality of relay devices, where the data is uplink data sent by the remote device to a radio access network device.

Optionally, the configuration message further includes first indication information. The first indication information indicates at least two sidelinks between the remote device and the plurality of relay devices. The configuration message is for configuring a splitting proportion of data that is in the PDCP entity and that is sent by the remote device to each of the at least two sidelinks.

Optionally, the configuration message further includes second indication information. The second indication information indicates that one of the plurality of relay devices is a primary device, and a remaining device in the plurality of relay devices is a secondary device. The configuration message is for configuring a splitting proportion of data that is in the PDCP entity and that is separately sent by the remote device to the primary device and the secondary device.

Optionally, the splitting proportion is applicable to all data radio bearers DRBs of the remote device, and the PDCP entity is a PDCP entity of the DRB of the remote device.

Figure 20:
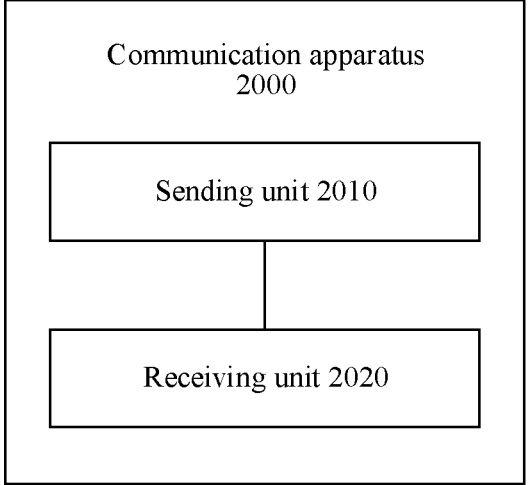
FIG. 20 is another schematic block diagram of a communication apparatus according to an embodiment of this application.

FIG. 20 is a schematic block diagram of a communication apparatus according to an embodiment of this application. As shown in the figure, the communication apparatus 2000 may include a sending unit 2010 and a receiving unit 2020.

In a possible design, the communication apparatus 2000 may correspond to the radio access network device in the foregoing method embodiment.

Specifically, the communication apparatus 2000 may correspond to the radio access network device in FIG. 12 according to an embodiment of this disclosure. The units in the communication apparatus 2000 and the foregoing other operations and/or functions are respectively to implement corresponding procedures in FIG. 12.

The sending unit 2010 is configured to send a configuration message to a remote device. The configuration message is for configuring a splitting proportion of data that is in a packet data convergence protocol PDCP entity and that is sent by the remote device to a plurality of relay devices. The receiving unit 2020 is configured to receive uplink data transmitted by the plurality of relay devices. The uplink data is data sent by the remote device to the radio access network device.

Optionally, the configuration message further includes first indication information. The first indication information indicates at least two sidelinks between the remote device and the plurality of relay devices. The configuration message is for configuring a splitting proportion of data that is in the PDCP entity and that is sent by the remote device to each of the at least two sidelinks.

Optionally, the configuration message further includes second indication information. The second indication information indicates that one of the plurality of relay devices is a primary device, and a remaining device in the plurality of relay devices is a secondary device. The configuration message is for configuring a splitting proportion of data that is in the PDCP entity and that is separately sent by the remote device to the primary device and the secondary device.

Optionally, the splitting proportion is applicable to all data radio bearers DRBs of the remote device, and the PDCP entity is a PDCP entity of the DRB of the remote device.

Figure 21:
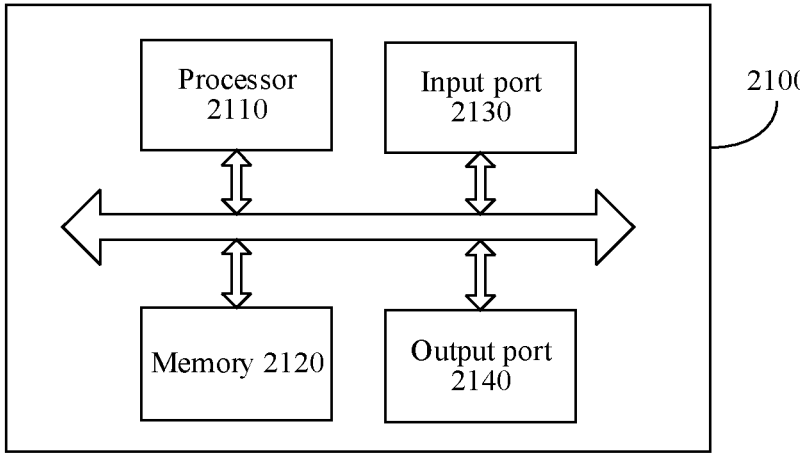
FIG. 21 is another schematic block diagram of a communication apparatus according to an embodiment.

According to the foregoing method, FIG. 21 is a schematic diagram of a communication apparatus 2100 according to an embodiment of this disclosure. As shown in FIG. 21, the apparatus 2100 may include a processor 2110, and may further include a memory 2120. The memory 2120 is configured to store instructions, and the processor 2110 is configured to execute the instructions stored in the memory 2120, so that the apparatus 2100 implements the steps performed in the method corresponding to any one of FIG. 6 to FIG. 13.

Further, the apparatus 2100 may include an input port 2130 (an example of the transceiver module) and an output port 2140 (another example of the transceiver module). Further, the processor 2110, the memory 2120, the input port 2130, and the output port 2140 may communicate with each other through an internal connection path, to transfer a control signal and/or a data signal. The memory 2120 is configured to store a computer program. The processor 2110 may be configured to invoke the computer program from the memory 2120 and run the computer program, to control the input port 2130 to receive a signal, and control the output port 2140 to send a signal, to complete steps performed by the terminal device in the foregoing method. The memory 2120 may be integrated into the processor 2110, or may be separated from the processor 2110.

If the communication apparatus 2100 is a communication device, the input port 2130 is a receiver and the output port 2140 is a transmitter. The receiver and the transmitter may be a same physical entity or different physical entities. When the receiver and the transmitter are a same physical entity, the receiver and the transmitter may be collectively referred to as a transceiver.

If the communication apparatus 2100 is a chip or a circuit, the input port 2130 is an input interface and the output port 2140 is an output interface.

In an implementation, it may be considered that functions of the input port 2130 and the output port 2140 are implemented through a transceiver circuit or a dedicated transceiver chip. It may be considered that the processor 2110 is implemented by using a dedicated processing chip, a processing circuit, a processor, or a general-purpose chip.

In another implementation, it may be considered that the communication device provided in this embodiment of this disclosure is implemented by using a general-purpose computer. To be specific, program code for implementing functions of the processor 2110, the input port 2130, and the output port 2140 is stored in the memory 2120, and a general-purpose processor executes the code in the memory 2120 to implement the functions of the processor 2110, the input port 2130, and the output port 2140.

For concepts, explanations, detailed descriptions, and other steps of the apparatus 2100 that are related to the technical solutions provided in embodiments of this application, refer to the descriptions of the content in the foregoing method or another embodiment. Details are not described herein again.

In addition, an embodiment of this disclosure further provides a communication system, including one or more of the remote device, the relay device, and the radio access network device in embodiments of this disclosure.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this disclosure, it should be understood that the disclosed system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations and are not intended to limit the protection scope of this disclosure. Any variation or replacement readily determined by a person skilled in the art within the technical scope of this disclosure shall fall within the protection scope of the claims.

What is claimed is:

1. A data transmission method, comprising:

obtaining, by a remote device, first indication information indicating a splitting proportion of a data volume of a packet data convergence protocol (PDCP) entity; and calculating, by the remote device, a buffer status (BS) based on the splitting proportion indicated by the first indication information; wherein:

the splitting proportion comprises a data proportion of a data volume of the PDCP entity and that is allocated to at least one of a first link or a data proportion of a data volume that is of the PDCP entity and that is allocated to a second link, the first link for carrying uplink data transmitted by the remote device to a radio access network device, and the second link for carrying uplink data transmitted by the remote device to the radio access network device through a plurality of relay devices;

the calculating a BS based on the splitting proportion comprises calculating a BS in at least one of a first buffer status report (BSR) based on the splitting proportion or calculating a BS in a second BSR based on the splitting proportion, wherein the first BSR provides for requesting to schedule a Uu uplink resource, and the second BSR provides for requesting to schedule a sidelink resource; and sending, by the remote device, at least one of the first BSR or the second BSR to the radio access network device.

2. The method according to claim 1, wherein the obtaining first indication information comprises:

receiving, by the remote device, the first indication information from the radio access network device; or obtaining, by the remote device, the first indication information locally preconfigured by the remote device.

3. The method according to claim 1, wherein the calculating a buffer status (BS) comprises one of:

allocating all data volumes of the PDCP entity to the BS in the first BSR and sending the first BSR to the radio access network device;

allocating all data volumes of the PDCP entity to the BS in the second BSR and sending the second BSR to the radio access network device; or proportionately allocating the data volumes of the PDCP entity to the BS in the first BSR and to the BS in the second BSR, wherein a range of the proportional allocation for the splitting proportion is greater than 0 and less than 1, and sending the first BSR and the second BSR to the radio access network device.

4. The method according to claim 1, wherein the splitting proportion is applicable to all data radio bearers (DRBs) of the remote device, and the PDCP entity is a PDCP entity of the DRB of the remote device.

5. The method according to claim 1, wherein the first indication information further comprises a bearer identifier corresponding to the splitting proportion.

6. The method according to claim 1, the method further comprising receiving, by the remote device, second indication information from the network device, the second indication information including an instruction for the remote device to schedule the Uu uplink resource and the sidelink resource.

7. An apparatus comprising:

at least one processor, and a memory coupled to the at least one processor and storing instructions for execution by the at least one processor that, when executed, the instructions cause the apparatus to perform operations comprising:

obtaining first indication information indicating a splitting proportion of a data volume of a packet data convergence protocol (PDCP) entity; and calculating a buffer status (BS) based on the splitting proportion indicated by the first indication information; wherein:

the splitting proportion comprises a data proportion of a data volume of the PDCP entity and that is allocated to at least one of a first link or a data proportion of a data volume that is of the PDCP entity and that is allocated to a second link, the first link for carrying uplink data transmitted by a remote device to a radio access network device, and the second link for carrying uplink data transmitted by the remote device to the radio access network device through a plurality of relay devices;

the calculating a BS based on the splitting proportion comprises calculating a BS in at least one of a first buffer status report (BSR) based on the splitting proportion or calculating a BS in a second BSR based on the splitting proportion, wherein the first BSR provides for requesting to schedule a Uu uplink resource, and the second BSR is for requesting to schedule a sidelink resource; and sending at least one of the first BSR or the second BSR to the radio access network device.

8. The apparatus according to claim 7, wherein the obtaining first indication information comprises:

receiving the first indication information from the radio access network device; or obtaining the first indication information locally preconfigured by a remote device.

9. The apparatus according to claim 7, wherein the calculating a buffer status BS based on the splitting proportion indicated by the first indication information comprises:

allocating all data volumes of the PDCP entity to the BS in the first BSR, and sending the first BSR to the radio access network device;

allocating all data volumes of the PDCP entity to the BS in the second BSR and sending the second BSR to the radio access network device; or proportionately allocating the data volumes of the PDCP entity to the BS in the first BSR and to the BS in the second, wherein a range of the proportional allocation for the splitting proportion is greater than 0 and less than 1, and sending the first BSR and the second BSR to the radio access network device.

10. The apparatus according to claim 7, wherein the splitting proportion is applicable to all data radio bearers (DRBs) of the remote device, and the PDCP entity is a PDCP entity of the DRB of a remote device.

11. The apparatus according to claim 7, wherein the first indication information further comprises a bearer identifier corresponding to the splitting proportion.

12. The apparatus according to claim 7, wherein, when executed, the instructions cause the apparatus to perform operations comprising:

receiving second indication information from the network device, the second indication information instructing a remote device to schedule the Uu uplink resource and the sidelink resource.

13. An apparatus comprising:

at least one processor; and a memory storing instructions for execution by the at least one processor that, when executed, the instructions cause the apparatus to perform operations comprising:

sending a first indication message to a remote device, the first indication message indicating a splitting proportion of a data volume of a packet data convergence protocol (PDCP) entity, wherein the splitting proportion comprises a data proportion of a data volume of the PDCP entity that is allocated to a first link and a data proportion of a data volume of the PDCP entity that is allocated to a second link, the first link providing for receipt by a radio access network device of uplink data transmitted by the remote device, and the second link providing for receipt by the radio access network device of the uplink data transmitted by the remote device by using a plurality of relay devices; and receiving a first buffer status report (BSR) and a second BSR sent by the remote device, the first BSR providing for requesting to schedule a Uu uplink resource, and the second BSR providing for requesting to schedule a sidelink resource.

14. The apparatus according to claim 13, wherein the splitting proportion is applicable to all data radio bearers (DRBs) of the remote device, and the PDCP entity is a PDCP entity of the DRB of the remote device.

15. The apparatus according to claim 13, wherein the first indication information further comprises a bearer identifier corresponding to the splitting proportion.

16. The apparatus according to claim 13, wherein, when executed, the instructions cause the apparatus to perform operations comprising:

sending second indication information to the remote device, the second indication information instructing the remote device to schedule the Uu uplink resource and the sidelink resource.

* * * * *